(12) United States Patent
Ochi

(10) Patent No.: US 10,061,077 B2
(45) Date of Patent: Aug. 28, 2018

(54) BACKLIGHT DEVICE AND DISPLAY DEVICE INCLUDING THE SAME

(71) Applicant: Japan Display Inc., Tokyo (JP)

(72) Inventor: Tetsuro Ochi, Tokyo (JP)

(73) Assignee: Japan Display Inc., Tokyo (JP)

( * ) Notice: Subject to any disclaimer, the term of this patent is extended or adjusted under 35 U.S.C. 154(b) by 68 days.

(21) Appl. No.: 15/395,134

(22) Filed: Dec. 30, 2016

(65) Prior Publication Data

US 2017/0199322 A1 Jul. 13, 2017

(30) Foreign Application Priority Data

Jan. 7, 2016 (JP) .................................. 2016-001884
Oct. 24, 2016 (JP) .................................. 2016-207855

(51) Int. Cl.
*G02F 1/1333* (2006.01)
*F21V 8/00* (2006.01)

(52) U.S. Cl.
CPC ......... *G02B 6/0088* (2013.01); *G02B 6/0051* (2013.01); *G02B 6/0055* (2013.01); *G02F 1/133308* (2013.01); *G02F 2202/28* (2013.01)

(58) Field of Classification Search
CPC .. G02B 6/0055; G02B 6/0088; G02B 6/0051; G02F 2202/28; G02F 2001/133314; G02F 2001/133317; G02F 1/133308
See application file for complete search history.

(56) References Cited

U.S. PATENT DOCUMENTS

| 6,219,117 B1 | 4/2001 | Nagakubo et al. |
| 6,313,891 B1 | 11/2001 | Nagakubo et al. |
| 2011/0285934 A1 | 11/2011 | Watanabe |
| 2013/0027857 A1* | 1/2013 | Jeong ................ G02F 1/133308 361/679.01 |
| 2013/0321293 A1* | 12/2013 | Park ........................ G06F 3/041 345/173 |
| 2014/0029294 A1 | 1/2014 | Huang |
| 2014/0240639 A1* | 8/2014 | Jung ................. G02F 1/133615 349/60 |

(Continued)

FOREIGN PATENT DOCUMENTS

| CN | 103744217 A | 4/2014 |
| JP | H10-170919 A | 6/1998 |
| JP | 2001-154193 | 6/2001 |

(Continued)

OTHER PUBLICATIONS

Office Action dated Sep. 21, 2017 in related TW Application No. 105143807.

(Continued)

*Primary Examiner* — Jia Pan
(74) *Attorney, Agent, or Firm* — K&L Gates LLP

(57) ABSTRACT

A backlight device includes a frame formed of a transparent resin, a first diffusion adhesive layer with a light diffusion, provided on a first surface of the frame, a second diffusion adhesive layer with a light diffusion, provided on a second surface of the frame which is opposite to the first surface, a reflecting sheet adhered to the frame with the first diffusion adhesive layer, a light guide plate on the reflecting sheet in the frame, and a light source disposed in the frame to irradiate light to the light guide plate.

20 Claims, 20 Drawing Sheets

(56) References Cited

U.S. PATENT DOCUMENTS

2015/0016090 A1    1/2015  Lee et al.
2015/0098043 A1*  4/2015  Matsumoto ............ G02B 6/009
                                                                     349/58

FOREIGN PATENT DOCUMENTS

| JP | 2001-154193 A | 6/2001 |
| --- | --- | --- |
| JP | 2005-049764 | 2/2005 |
| JP | 2005-049764 A | 2/2005 |
| JP | 2008-083300 | 4/2008 |
| JP | 2010-026216 A | 2/2010 |
| JP | 2012-064420 | 3/2012 |
| JP | 5122657 B2 | 1/2013 |
| JP | 2013-114811 | 6/2013 |
| JP | 201467037A A | 4/2014 |
| TW | I477856 B | 3/2015 |

OTHER PUBLICATIONS

Korean Office Action dated Jun. 7, 2018 in corresponding Korean Application No. 10-2017-0000656.

* cited by examiner

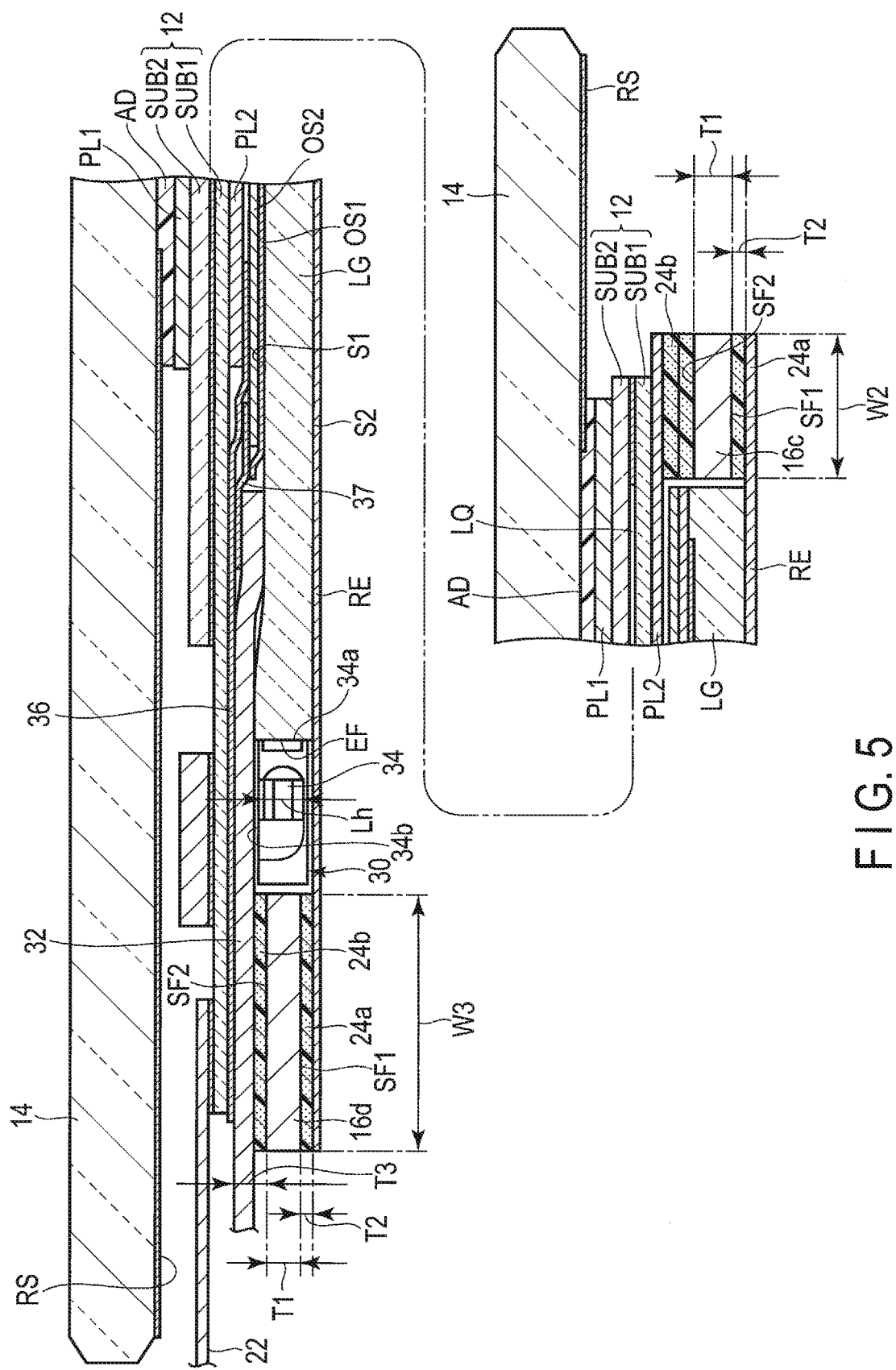
F I G. 5

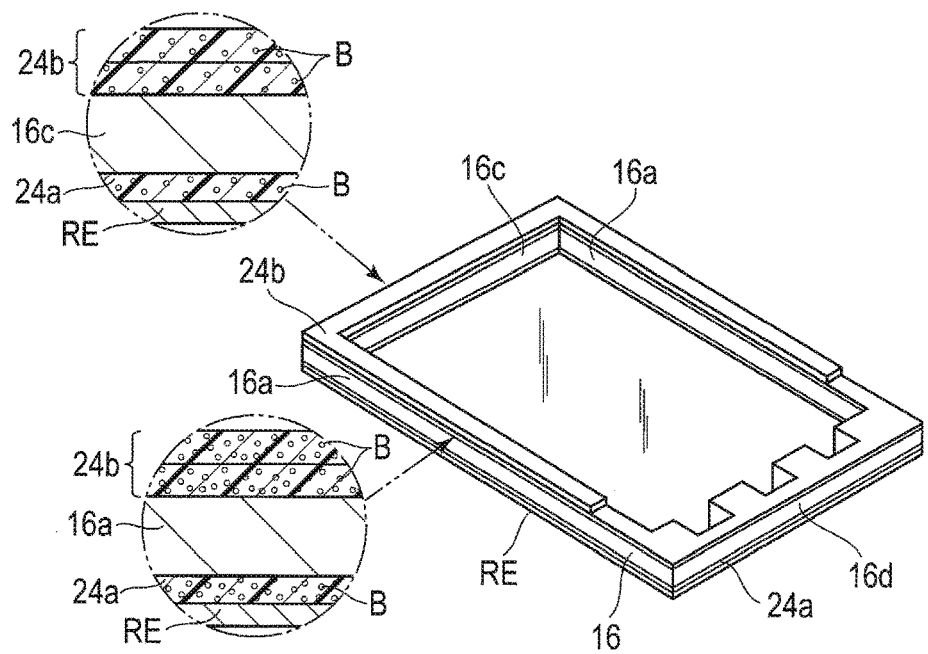
F I G. 6A
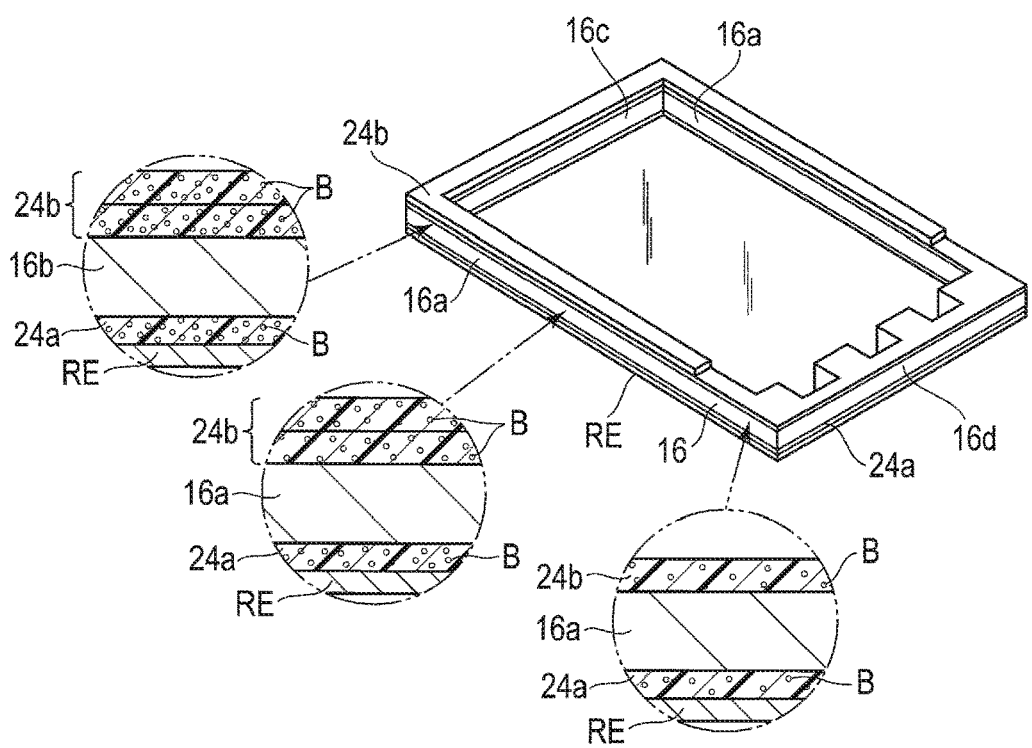
F I G. 6B

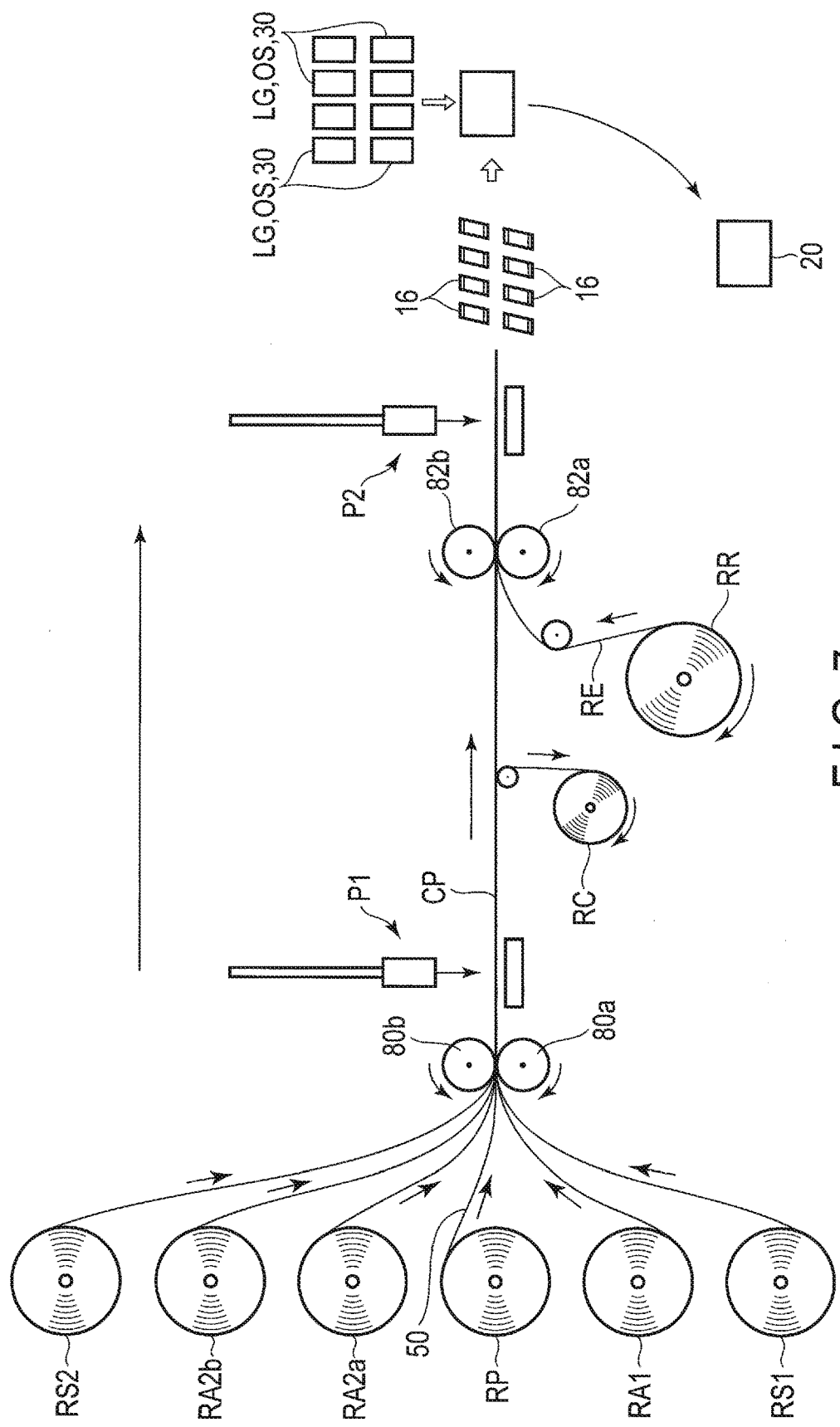

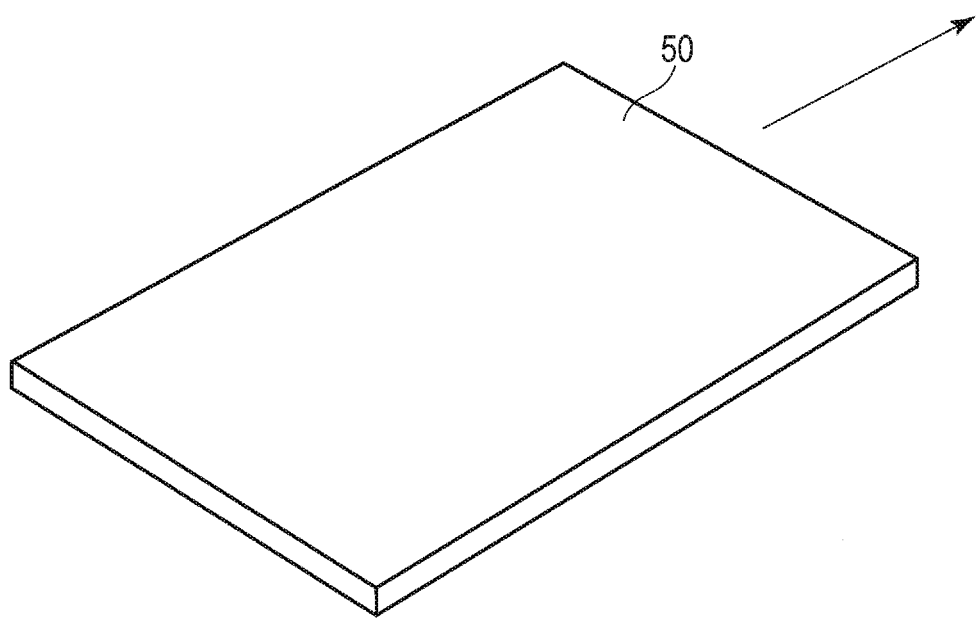
F I G. 8
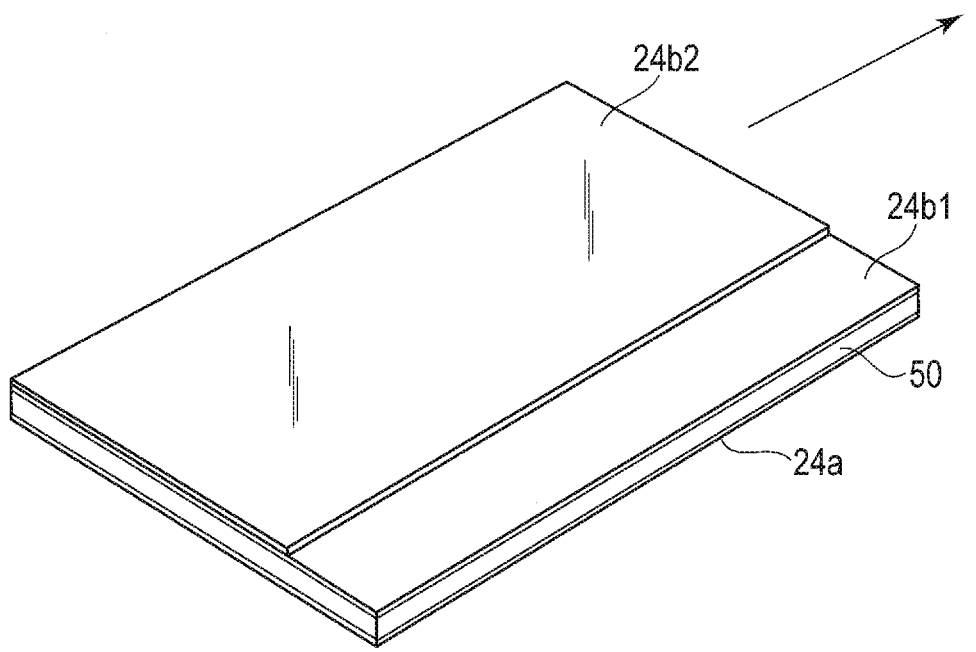
F I G. 9

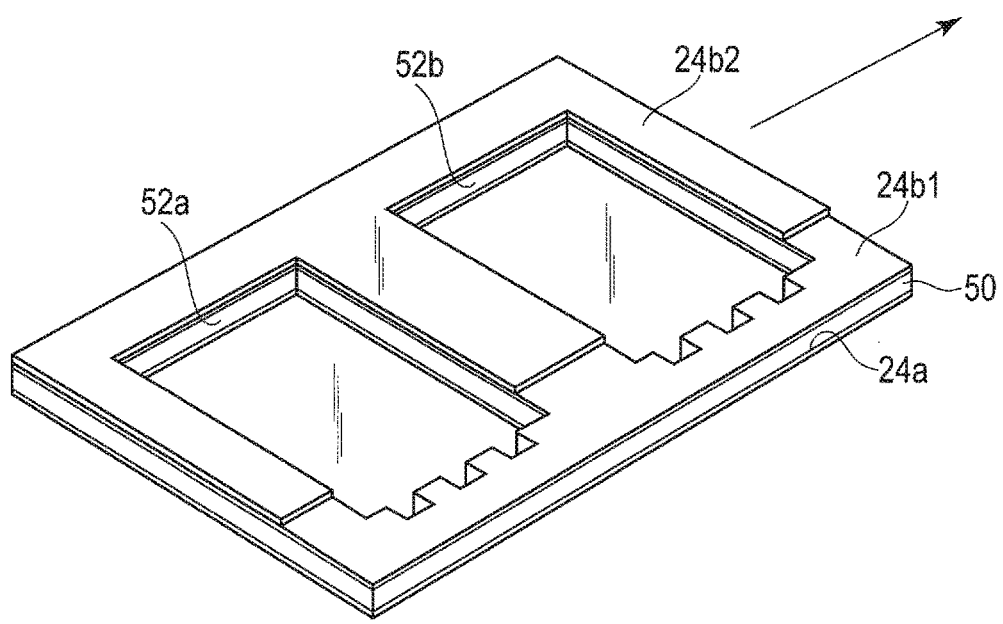
F I G. 10
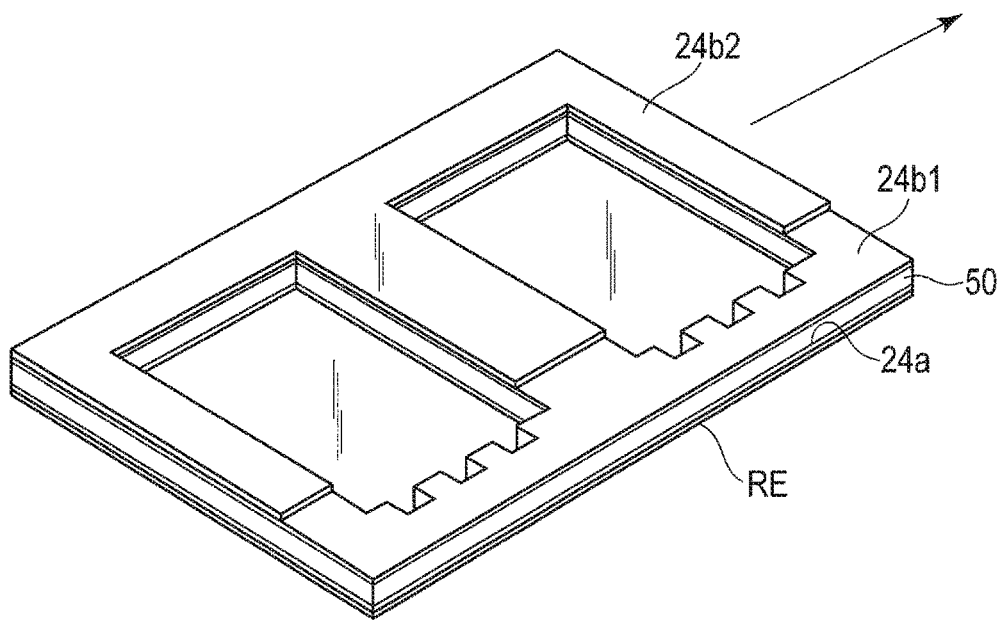
F I G. 11

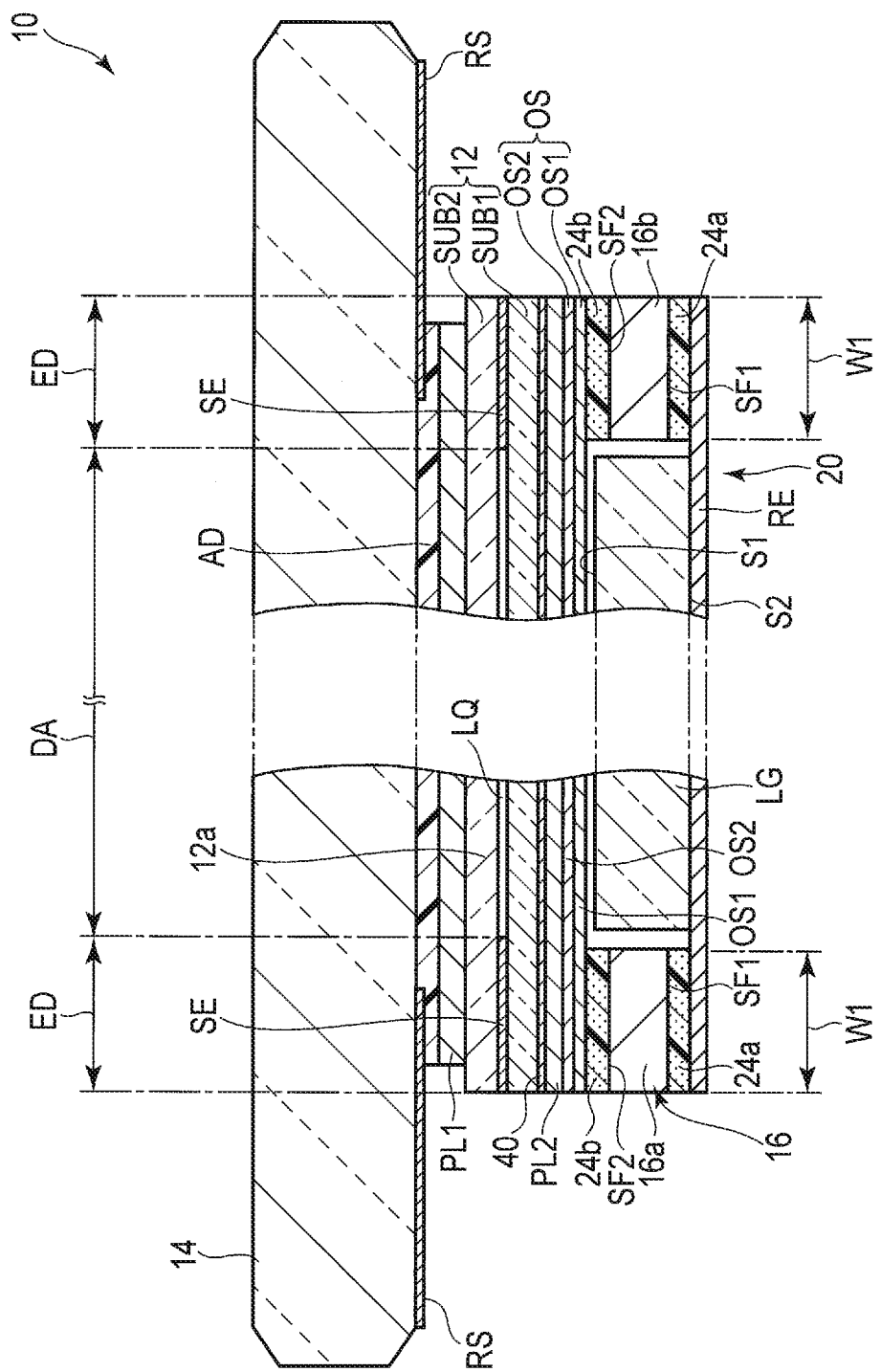
F I G. 13

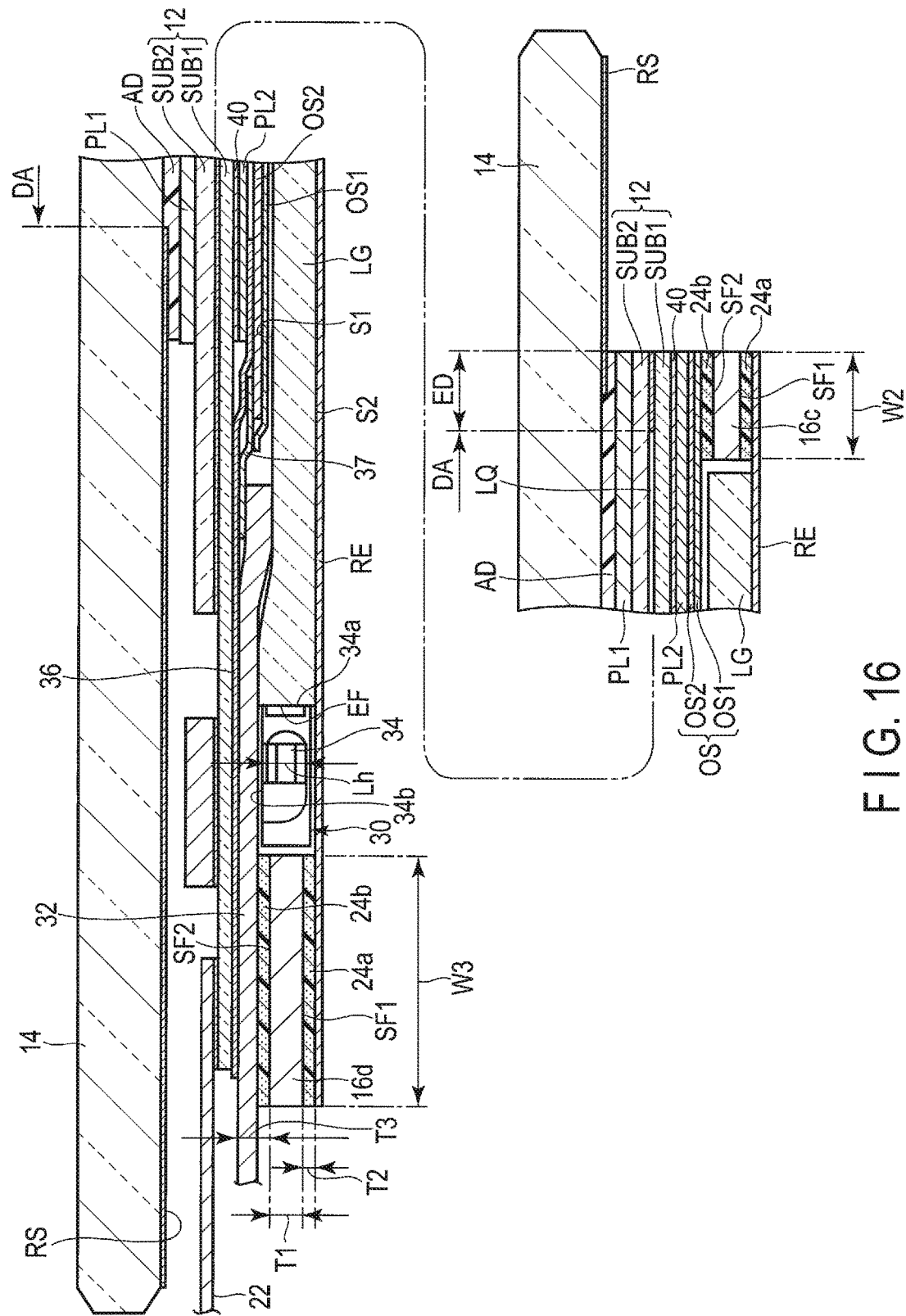
F I G. 16

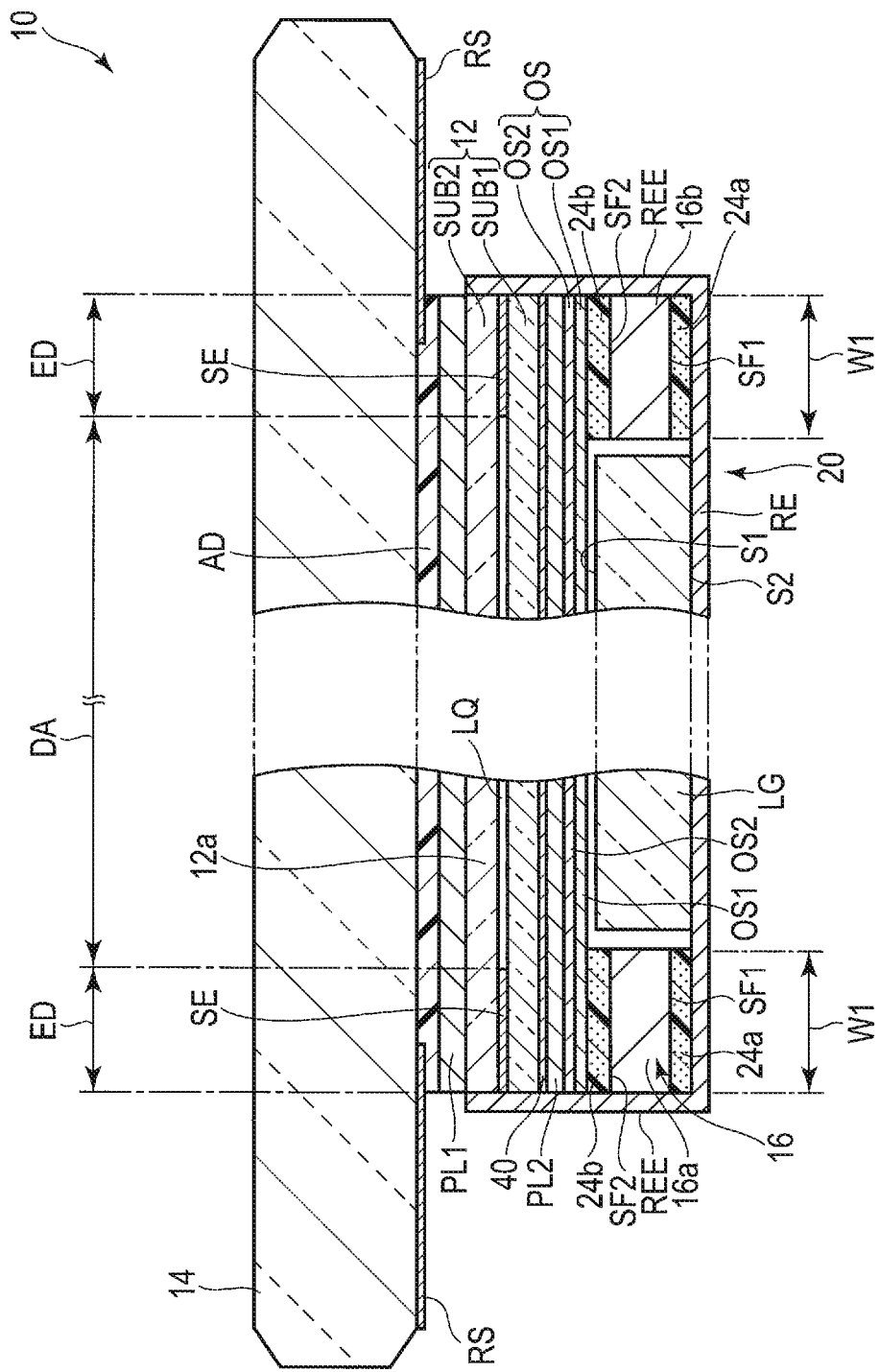
F I G. 17

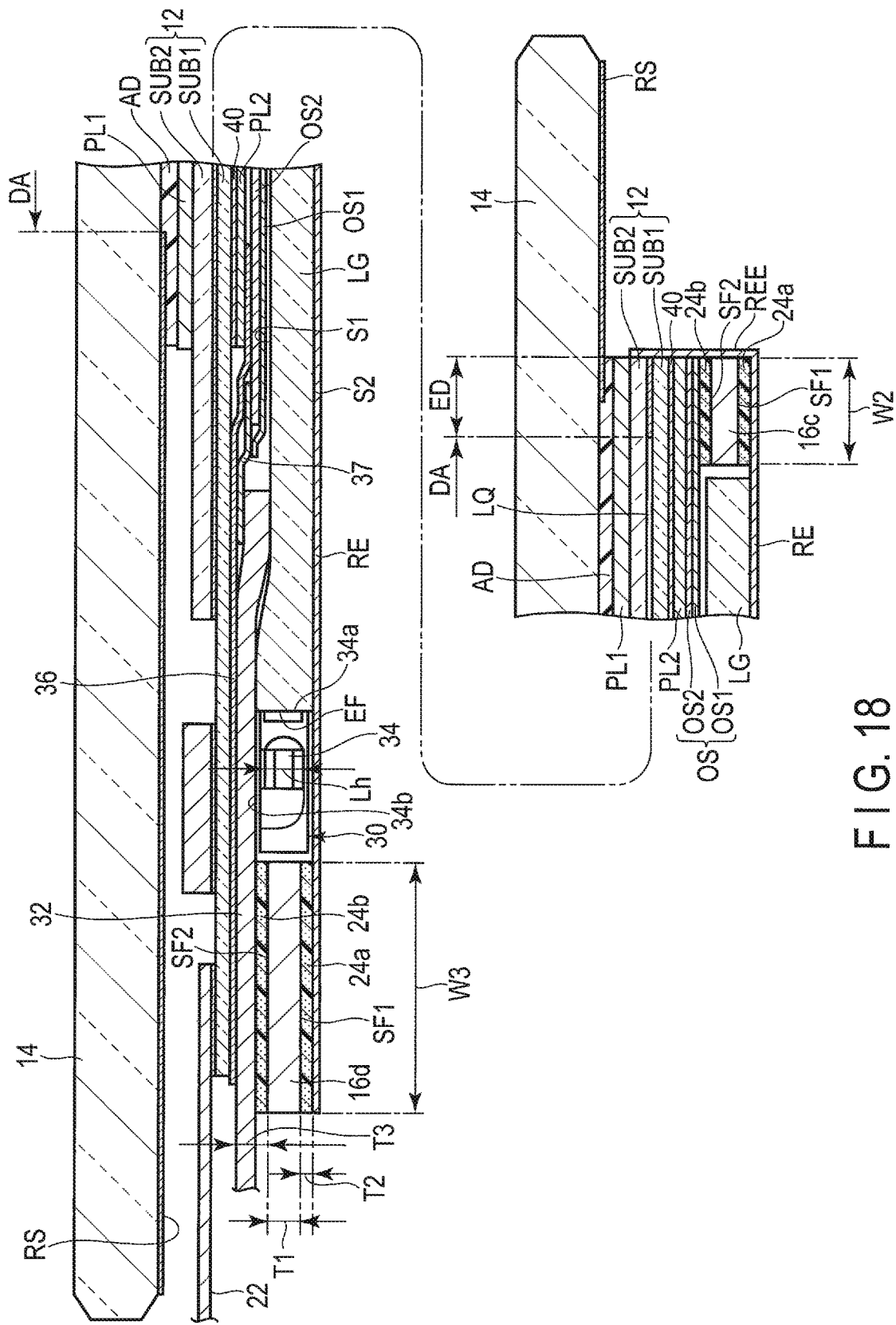
F I G. 18

BACKLIGHT DEVICE AND DISPLAY DEVICE INCLUDING THE SAME

CROSS-REFERENCE TO RELATED APPLICATIONS

This application is based upon and claims the benefit of priority from Japanese Patent Applications No. 2016-001884, filed Jan. 7, 2016; and No. 2016-207855, filed Oct. 24, 2016, the entire contents of all of which are incorporated herein by reference.

FIELD

Embodiments described herein relate generally to a backlight device and a display device including the same.

BACKGROUND

In recent years, liquid crystal display devices have come to be widely used in smartphones, personal digital assistants (PDAs), tablet computers, satellite navigation systems, etc. In general, a liquid crystal display device comprises a liquid crystal display panel and a surface illumination device (backlight device) which is overlaid on the rear surface of the liquid crystal display panel and illuminates the liquid crystal display panel. Conventional backlight devices include a reflective layer, a lightguide plate (lightguide), an optical sheet, light emitting diodes (LEDs) as light sources, and a rectangular frame formed of resin. The reflective layer, the lightguide plate, and the optical sheet are stacked on each other, and disposed in the frame. The reflective layer, the lightguide plate, and the optical sheet are thereby supported and positioned by the frame.

Furthermore, there has been proposed a structure in which a frame is engaged in a container formed of a metal plate (backlight cover), and the reflective layer, lightguide plate, and optical sheet are arranged inside a hollow part of the frame.

In recent years, as display areas have increased, there has been a continual demand for the frames of liquid crystal display devices to become ever narrower and the liquid crystal display devices to become ever thinner. However, the dimensions such as width, thickness, etc., of the frame in the above-described backlight device is approaching the structural limit of injection molding, and such a demand is difficult to achieve.

Furthermore, a tolerance between an effective illumination area of the backlight device and a liquid crystal display effective area has become smaller. Thus, when the backlight device is attached to a liquid crystal display device, the liquid crystal display effective area shifts to the outside of the effective illumination area, and the display quality may decrease.

SUMMARY

The present application relates generally to a backlight device and a display device including the same.

In an embodiment, a backlight device is provided. The backlight device includes a frame formed of a transparent resin; a first diffusion adhesive layer with a light diffusion, disposed on a first surface of the frame; a second diffusion adhesive layer with a light diffusion, disposed on a second surface of the frame which is opposite to the first surface; a reflecting sheet adhered to the frame with the first diffusion adhesive layer; a lightguide plate on the reflecting sheet in the frame; and a light source disposed in the frame to enter light to the lightguide plate.

Additional features and advantages are described herein, and will be apparent from the following Detailed Description and the figures.

BRIEF DESCRIPTION OF THE DRAWINGS

FIG. 5 is a sectional view of the liquid crystal display device taken along line B-B of FIG. 1.

FIG. 6A is a schematic view of diffusion distribution of a diffusion adhesive layer in a frame.

FIG. 6B is a schematic view of diffusion distribution of a diffusion adhesive layer in a frame.

FIG. 7 is a diagram schematically showing an example of a manufacturing apparatus of backlight devices.

FIG. 8 is a perspective view showing a sheet material in manufacturing steps of the backlight devices.

FIG. 9 is a perspective view showing a state in which diffusion adhesive layers are formed on a first surface and a second surface of the sheet material, respectively, in the manufacturing steps.

FIG. 10 is a perspective view showing a state in which inner windows (inner holes) of frames are punched in the manufacturing steps.

FIG. 11 is a perspective view showing a state in which a reflecting sheet is attached to one of the diffusion adhesive layers in the manufacturing steps.

FIG. 13 is a horizontal sectional view of a liquid crystal display device of a second embodiment.

FIG. 16 is a vertical sectional view of the liquid crystal display device of the third embodiment.

FIG. 17 is a horizontal sectional view of a liquid crystal display device of a fourth embodiment.

FIG. 18 is a vertical sectional view of the liquid crystal display device of the fourth embodiment.

DETAILED DESCRIPTION

Figure 1:
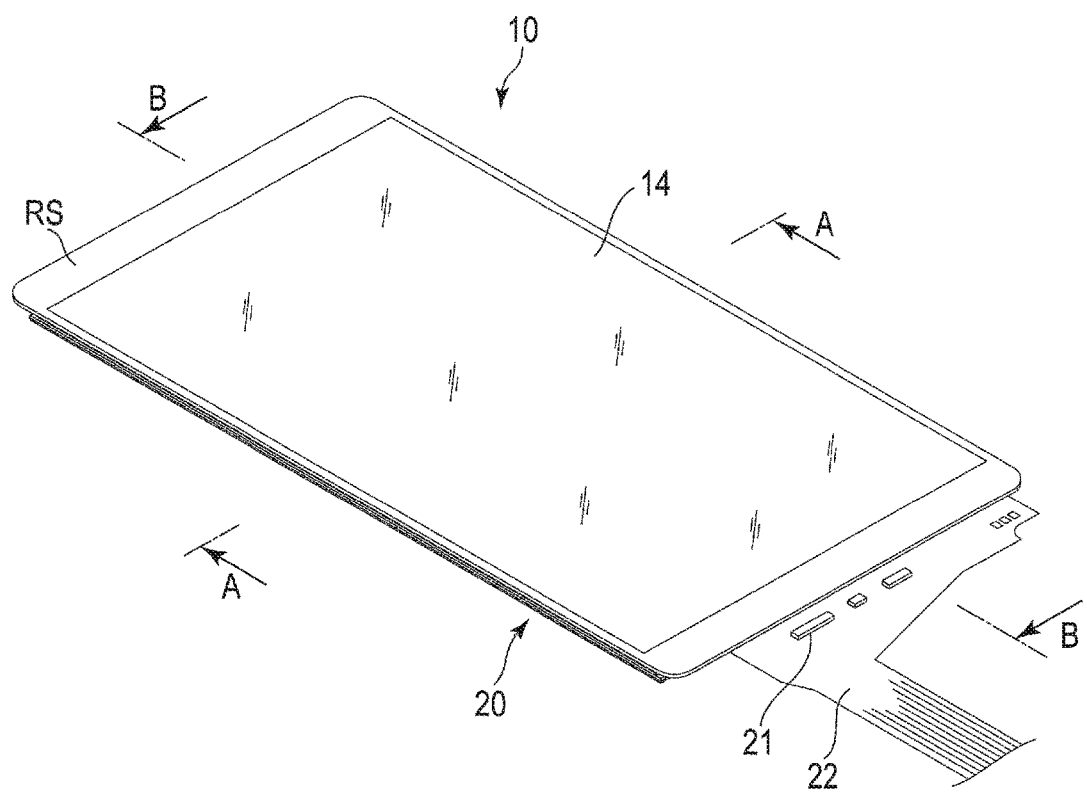
FIG. 1 is a perspective view showing a display surface side of a liquid crystal display device according to an embodiment.

Various embodiments will be described hereinafter with reference to the accompanying drawings. In general, according to one embodiment, a backlight device comprises a frame formed of a transparent resin, a first diffusion adhesive layer with a light diffusion, provided on a first surface of the frame, a second diffusion adhesive layer with a light diffusion, provided on a second surface of the frame which is opposite to the first surface, a reflecting sheet adhered to the frame with the first diffusion adhesive layer, a lightguide plate on the reflecting sheet in the frame, and a light source disposed in the frame to irradiate light to the lightguide plate.

The disclosure is merely an example, and proper changes within the spirit of the invention, which are easily conceivable by a person with ordinary skill in the art, are included in the scope of the invention as a matter of course. In addition, in some cases, in order to make the description clearer, the widths, the thicknesses, the shapes, etc., of the respective parts are schematically illustrated in the drawings, compared to the actual modes. However, the schematic illustration is merely an example, and adds no restrictions on the interpretation of the present invention. Further, in the specification and drawings, the same elements as those described in connection with preceding drawings are given the same reference numbers, and a detailed description thereof is omitted as appropriate.

(First Embodiment)

Figure 2:
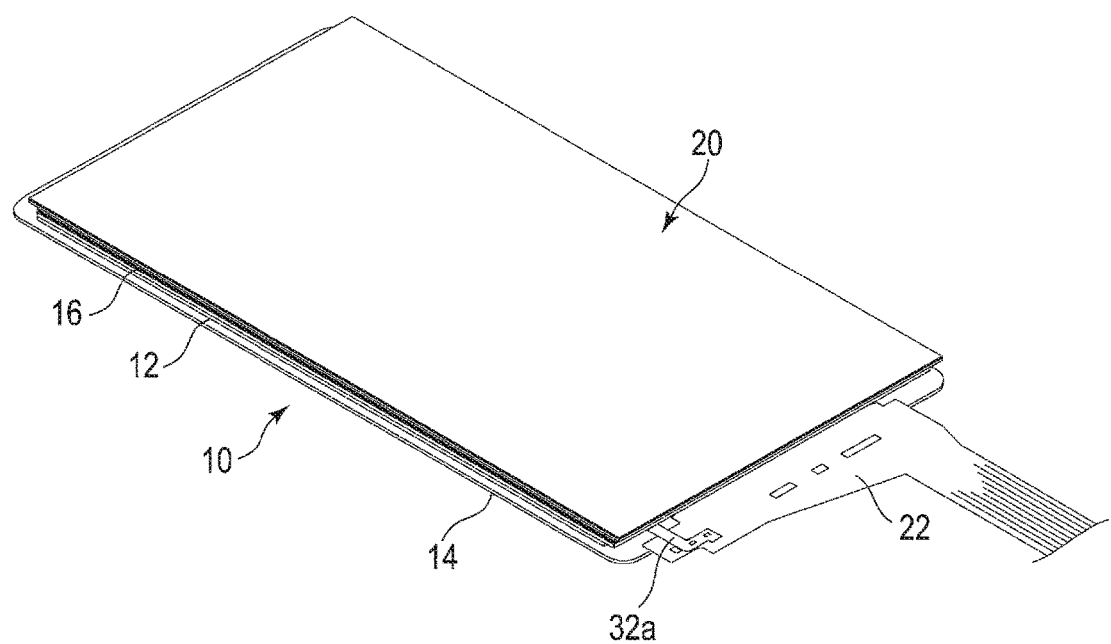
FIG. 2 is a perspective view showing a rear surface side of the liquid crystal display device.
Figure 3:
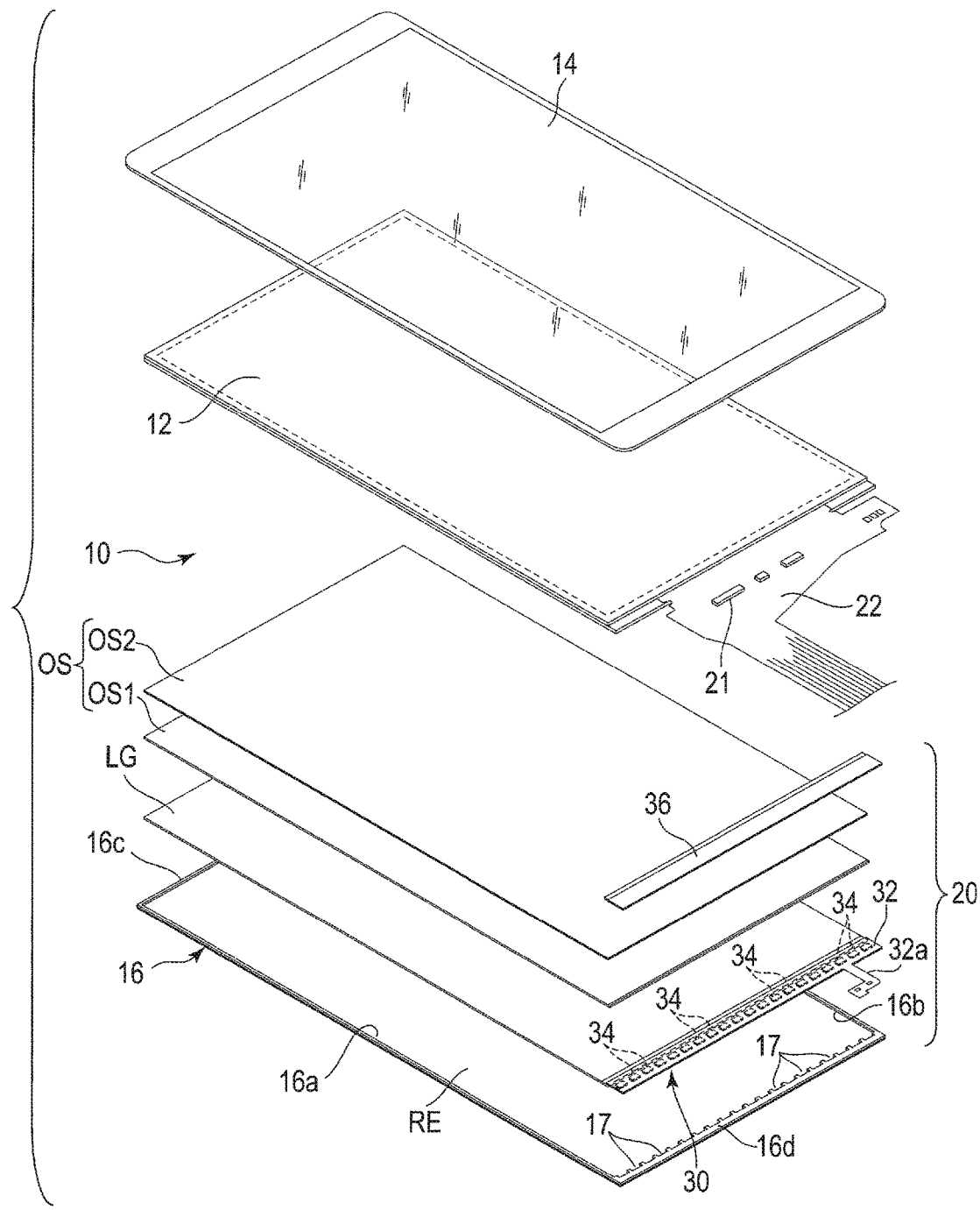
FIG. 3 is an exploded perspective view of the liquid crystal display device.

FIG. 1 and FIG. 2 are perspective views showing a display surface side and a rear surface side of a liquid crystal display device according to a first embodiment, respectively. FIG. 3 is an exploded perspective view of the liquid crystal display device.

A liquid crystal display device (LCD) 10 can be incorporated into various electronic apparatuses, for example, a smartphone, a tablet computer, a feature phone, a notebook computer, a portable game console, an electronic dictionary, a television set, and a satellite navigation system.

As shown in FIG. 1 to FIG. 3, the LCD 10 comprises an active-matrix plate-shaped liquid crystal display panel (LCD panel) 12, a cover panel 14 overlaid on a display surface 12a, which is one flat surface of the LCD panel 12, and covering the whole display surface, and a backlight unit (backlight device) 20 opposed to the rear surface side, which is the other flat surface of the LCD panel 12.

Figure 4:
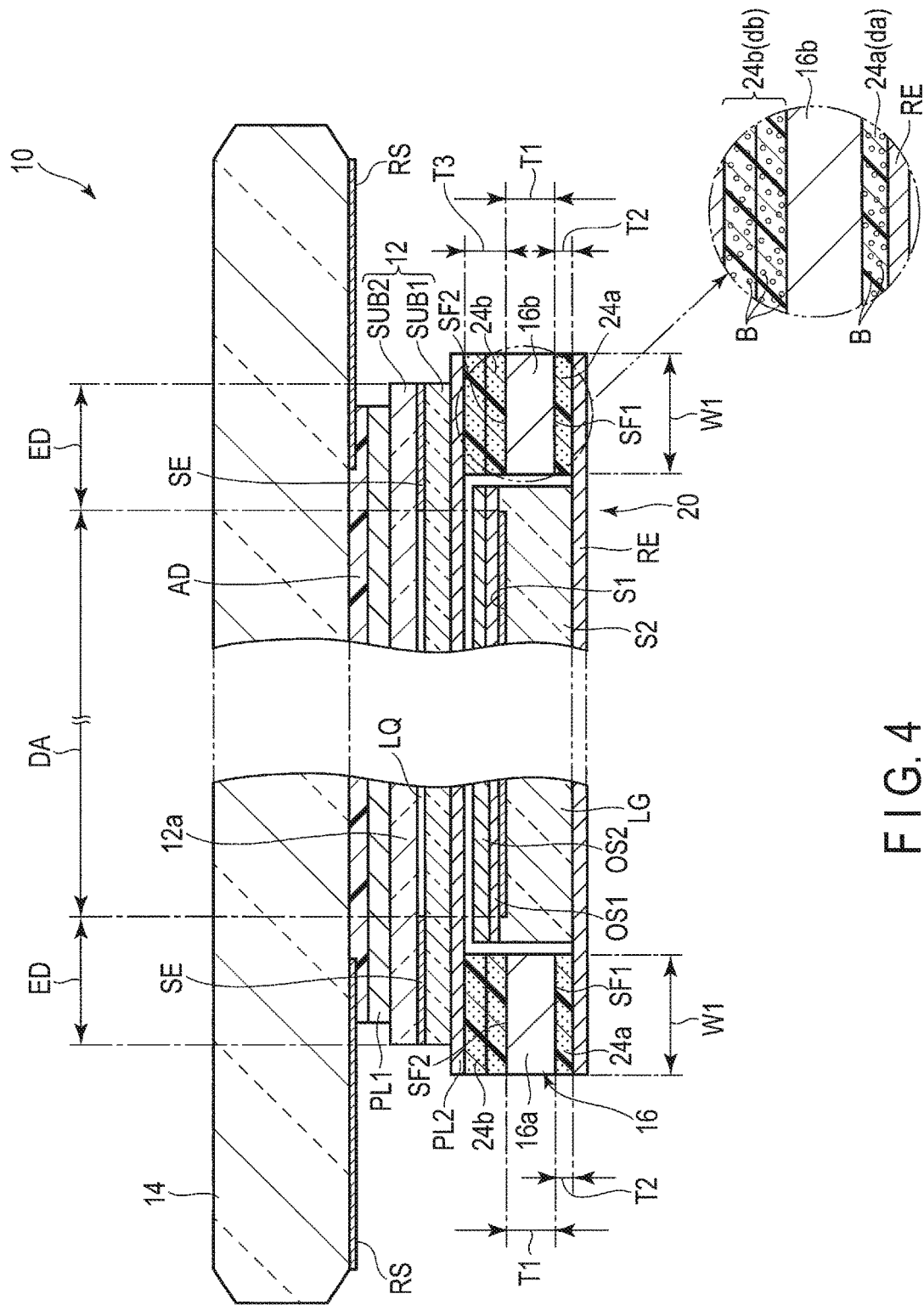
FIG. 4 is a sectional view of the liquid crystal display device taken along line A-A of FIG. 1.

FIG. 4 is a sectional view of the liquid crystal display device taken along line A-A of FIG. 1, and FIG. 5 is a sectional view of the liquid crystal display device taken along line B-B of FIG. 1. As shown in FIG. 3 to FIG. 5, the LCD panel 12 comprises a first substrate SUB1 in the shape of a rectangular plate, a second substrate SUB2 in the shape of a rectangular plate opposed to the first substrate SUB1, and a liquid crystal layer LQ provided between the first substrate SUB1 and the second substrate SUB2. The periphery of the second substrate SUB2 is affixed to the first substrate SUB1 with a sealing member SE. A polarizer PL1 is attached to the surface of the first substrate SUB1 to form the display surface 12a of the LCD panel 12. A polarizer PL2 is attached to the surface of the first substrate SUB1 (the rear surface of the LCD panel 12). The polarizer PL2 is, in a plan view, slightly greater than the external dimension of the first substrate SUB1 and covers the entirety of the surface of the first substrate SUB1. The plane view means a state where the LCD panel is viewed in a direction perpendicular to the surface of the LCD panel 12.

The LCD panel 12 is provided with a display area (active area) DA, which is within the area inside the sealing member SE in a plan view of the display surface 12a. An image is displayed in the display area DA. In addition, a frame area (non-display area) ED in the shape of a rectangular frame is provided around the display area DA. The display area is a rectangular, and the frame area is in the shape of a rectangular frame. The LCD panel 12 is of a transmissive type which displays an image by selectively transmitting light from the backlight unit 20 to the display area DA. The LCD panel 12 can adopt various display modes. For example, the LCD panel 12 may include a structure corresponding to a lateral electric field mode in which an electric field substantially parallel to a main surface of a substrate is primarily used, or may include a structure corresponding to a longitudinal electric field mode in which an electric field substantially perpendicular to the main surface of the substrate is primarily used.

In the shown example, a flexible printed circuit board (FPC) 22 is joined to an end portion on a short side of the first substrate SUB1, and extends outward from the LCD panel 12. On the FPC 22, a semiconductor element such as a driving IC chip 21 is mounted as a signal supply source which supplies a signal necessary to drive the LCD panel 12.

As shown in FIG. 1 to FIG. 5, the cover panel 14 is, for example, formed of a glass plate or an acrylic transparent resin and in the shape of a rectangular plate. The cover panel 14 has greater dimensions (width and length) than those of the LCD panel 12. Thus, the cover panel 14 has a larger area than that of the LCD panel 12 in a plan view. A frame-shaped light shielding layer RS is formed in the periphery of the rear surface of the cover panel 14 (the surface in the LCD panel 12 side, or the opposite surface to the surface opposed to a viewer). In the cover panel 14, the area other than the area opposed to the display area DA is light-shielded by the light shielding layer RS. Note that the light shielding layer RS may be formed on the upper surface of the cover panel 14 (display surface).

The rear surface (back surface) of the cover panel 14 is adhered to the polarizer PL1 by a light-transmissive or transparent adhesive agent or adhesion agent such as an adhesive sheet AD of an optical transparent resin. Thereby, the cover panel 14 covers the entirety of the display surface 12a of the LCD panel 12. The adhesive sheet AD is formed in the same size as the polarizer PL1 and is adhered to be aligned with the polarizer PL1. Note that an adhesive agent may be applied to the polarizer PL1 and its periphery instead of the adhesive sheet AD.

The periphery of the cover panel 14 projects further outward than the periphery of the LCD panel 12. Each of the long sides of the cover panel 14 is substantially parallel to the associated long side of the LCD panel 12 with a predetermined gap therebetween. Each of the short sides of the cover panel 14 is substantially parallel to the associated short side of the LCD panel 12 with a predetermined gap therebetween. In the present embodiment, the gap or distance between each long side of the cover panel 14 and each associated long side of the LCD panel 12, that is, the width of the periphery on the long sides of the cover panel 14, is less than the gap or distance between each short side of the cover panel 14 and each associated short side of the LCD panel 12, that is, the width of the periphery on the short sides of the cover panel 14.

The corners of the cover panel 14 and the LCD panel 12 may be rounded. In this case, it is not limited to round all corners, but one or two corners may be rounded. Further, corners of only of the cover panel or the LED panel may be rounded, or corners of both of the cover panel and the LCD panel may be rounded.

As shown in FIG. 3 to FIG. 5, the backlight unit 20 comprises a frame 16 in a shape of a rectangular attached to the rear surface of the LCD panel 12, a reflecting sheet RE attached to the rear surface of the frame 16, optical members disposed in the frame 16, and a light source unit 30 which supplies light to be emitted to the optical members.

The frame 16 is made of a sheet material having a thickness T1 of 0.40 mm (400 µm) or less, for example, 0.10 to 0.25 mm (100 to 255 µm). The external dimension of the frame 16 is slightly greater than that of the LCD panel 12 but less than that of the cover panel 14, in a plane view. As the sheet material, a light-transmissive or transparent resin sheet, for example a sheet of polyethylene terephthalate (PET) can be used. The sheet material herein used includes a sheet having a thickness of approximately 100 to 300 µm, a film or thin film having a thickness less than 100 µm, etc.

As will be described later, the frame 16 is formed by punching the resin sheet material, and has predetermined dimensions. Furthermore, the frame 16 is formed to have the thickness T1 that is uniform over the whole perimeter, and smooth in the thickness direction (z-direction in section). In the present embodiment, the thickness T1 of the frame 16 (the thickness of the sheet material) is 0.188 mm (188 µm) or 0.25 mm (250 µm). The frame 16 includes a first surface SF1 and a second surface FS2. The second surface SF2 is an upper surface facing the LCD panel 12 and the first surface SF1 is a lower surface opposite to the second surface SF2.

The frame 16 comprises a pair of longwise bars 16a and 16b opposed to each other and a pair of sidelong bars 16c and 16d opposed to each other. Each of the longwise bars 16a and 16b is formed to have a width W1 of 0.6 mm (600 µm) or less, for example, 0.4 to 0.5 mm (400 to 500 µm). The one sidelong bar 16c is formed to have a width W2 of 0.6 mm (600 µm) or less, for example, 0.4 to 0.5 mm (400 to 500 µm), as in the case of the width W1. In addition, the other sidelong bar 16d may be formed to have a width W3 of 0.6 mm (600 µm) or less, for example, 0.4 to 0.5 mm (400 to 500 µm), as in the case of the width W2. The width W3 of the other sidelong bar 16d may be greater than the width W2. Moreover, depressions 17 are provided on the inner side edge of the other sidelong bar 16d.

Depending on some cases, one of the sidelong bars may be referred as an upside bar and the other sidelong bar may be referred as a downside bar. The pair of longwise bars may be referred as left and right bars. Further, the left and right bars and the upside bar, except for the downside bar, may be referred as three side bars.

A first diffusion adhesive layer 24a is provided on the lower surface (first surface) SF1 of the frame 16. In addition, a second diffusion adhesive layer 24b is formed on the upper surface (second surface) SF2 of the frame 16. As shown in FIG. 4, the first diffusion adhesive layer 24a and the second diffusion adhesive layer 24b are formed of a binder with a light diffusion, wherein the binder is formed of a transparent binder in which a large number of micro beads B of refractive index different from that of the transparent binder are added. As the binder, for example, an acrylic, polystyrene, polyester, epoxy, or vinyl polymerization binder, UV curing binder, or the like can be used. As the micro beads B, for example, light-transmissive hollow silica particles, glass particles, or synthetic resin particles can be used.

Moreover, usable examples of the transparent material for the micro-beads are thermoplastic resins including an acrylate resin such as polymethylmethacrylate or polyethyleneterephthalate, a polyester resin such as polybutylene terephthalate, a polystyrene resin, a polycarbonate resin and a polymethylpentene resin, and also those obtained by curing ionizing radiation-hardening resins of oligomers such as polyesteracrylate, urethaneacrylate and epoxyacrylate, and/or acrylate-based monomers, etc, with electromagnetic radiation such as electron rays or ultraviolet radiation and selecting those having excellent transparency. Other than the resins, glass, ceramics and the like will do as long as they are transparent.

The light diffusion of the diffusion adhesive layers can be arbitrarily adjusted by changing the amount of micro beads B, refractive index of micro beads B, or the like. In the present embodiment, light diffusion da of the first diffusion adhesive layer 24a is greater than light diffusion db of the second diffusion adhesive layer 24b. Here, the light diffusion db is the light diffusion of the entire of the second diffusion adhesive layer 24b provided on the longwise bars 16a and 16b and the sidelong bar 16c, and the number of layers of the second diffusion adhesive layer 24b is irrelevant.

For example, the first diffusion adhesive layer 24a is formed to have a thickness T2 of 0.01 to 0.06 mm (10 to 60 µm), and the second diffusion adhesive layer 24b on the longwise bars 16a and 16b and the upside bar 16c is formed to have a thickness T3 of 0.01 to 0.06 mm (10 to 60 µm). Accordingly, the sum of the thicknesses of the frame 16, the first diffusion adhesive layer 24a, and the second diffusion adhesive layer 24b is, for example, in the maximum thickness side including the longwise bars 16a and 16b and sidelong bar 16c, 0.32 to 0.52 mm (320 to 520 µm).

On the pair of longwise bars 16a and 16b, the first and second diffusion adhesive layers 24a and 24b have a width equal to the width W1 of the longwise bars 16a and 16b. At least the outer side surface (external surface) of the frame 16 and those of the first and second diffusion adhesive layers 24a and 24b are flush with each other. In the present embodiment, the inner side surface (internal surface) of the frame 16 is also flush with those of the first and second diffusion adhesive layers 24a and 24b. In other words, in terms of the distance between the longwise bars 16a and 16b of the frame 16, the internal dimension between the longwise bars 16a and 16b is equal to that between the first diffusion adhesive layers 24a, 24a on the longwise bars 16a and 16b and that between the second diffusion adhesive layers 24b, 24b on the longwise bars 16a, 16b. Similarly, the external dimension between the longwise bars 16a and 16b is equal to that between the first diffusion adhesive layers 24a, 24a on the longwise bars 16a and 16b and to that between the second diffusion adhesive layers 24b, 24b on the longwise bars 16b and 16b.

In the present embodiment, also at the sidelong bars 16c and 16d of the frame 16, each of the first diffusion adhesive layer 24a and the second diffusion adhesive layer 24b has a width equal to the widths W2 and W3 of the sidelong bars 16c and 16d. The external and internal surfaces of the frame 16 are flush with those of the first diffusion adhesive layer 24a, respectively. The external and internal surfaces of the frame 16 are flush with those of the second diffusion adhesive layer 24b, respectively. In other words, in terms of the distance between the sidelong bars 16c and 16d of the frame 16, the internal dimension between the sidelong bars 16c and 16d is equal to that between the first diffusion adhesive layers 24a, 24a on the sidelong bars 16c and 16d, and to that between the second diffusion adhesive layers 24b, 24b on the sidelong bars 16c and 16d. Similarly, the external dimension between the sidelong bars 16c and 16d is equal to that between the first diffusion adhesive layers 24a, 24a on the sidelong bars 16c and 16d, and to that between the second diffusion adhesive layers 24b, 24b on the sidelong bars 16c and 16d.

As the first diffusion adhesive layer 24a and the second diffusion adhesive layer 24b, double-sided tape with diffusion adhesive layers on both surfaces of a base material is used in the present embodiment. The thickness of each diffusion adhesive layer can be easily adjusted by changing the thickness of the base material.

The second diffusion adhesive layer 24b on the three side bars 16a, 16b and 16c, except for the downside bar 16d is formed thicker, e.g., twice thicker than that on the downside bar 16d. In this case, two stacked diffusion adhesive layers each having a thickness equal to that of the second diffusion adhesive layer 24b on the downside bar 16d can be used as the second diffusion adhesive layer 24b on the three side bars 16a, 16b, and 16c. In addition, the second diffusion adhesive layer 24b on the downside bar 16d is made thinner than that on the longwise bars 16a and 16b, whereby a gap for passing a flexible printed circuit board (FPC) 32 of the light source unit 30, which will be described later, is formed.

As schematically shown in FIG. 6A, in the first diffusion adhesive layer 24a, the amount of micro beads B may be adjusted such that the light diffusion of that part of the first diffusion adhesive layer 24a on the upside bar 16c becomes less than the light diffusion of each of those parts of the first diffusion adhesive layer 24a on the left and right bars 16a and 16b. Similarly, in the second diffusion adhesive layer 24b, the amount of micro beads B may be adjusted such that the light diffusion of that part of the second diffusion adhesive layer 24b on the upside bar 16c becomes less than the light diffusion of each of those parts of the second diffusion adhesive layer 24b on the left and right bars 16a and 16b.

Or, as schematically shown in FIG. 6B, the amount of micro beads B may be adjusted such that the light diffusion of the first diffusion adhesive layer 24a on each of the left and right bars 16a and 16b becomes gradually greater from the downside bar 16d to the upside bar 16c. Similarly, the amount of micro beads B may be adjusted such that the light diffusion of the second diffusion adhesive layer 24b on each of the left and right bars 16a and 16b becomes gradually greater from the downside bar 16d to the upside bar 16c.

A combination of the structure of FIG. 6A and the structure of FIG. 6B may be adopted. That is, the light diffusion of the first diffusion adhesive layer 24a and the second diffusion adhesive layer 24b on the upside bar 16c may be adjusted to become less than that of any point in the first and second diffusion adhesive layers 24a and 24b on the left and right bars 16a and 16b. For example, the light diffusion of the first and second diffusion adhesive layers 24a and 24b on the upside bar 16c is made less than that of the first and second diffusion adhesive layers 24a and 24b in the closest position to the light source. Or, the light diffusion of the first and second diffusion adhesive layers 24a and 24b on the upside bar 16c is made less than that of the first and second diffusion adhesive layers 24a and 24b on the left and right bars 16a and 16b in the most distant position from the light source. Furthermore, the light diffusion of the first and second diffusion adhesive layers 24a and 24b on the left and right bars 16a and 16b in the center of the longitudinal direction is made equal to the light diffusion of the first and second diffusion adhesive layers 24a and 24b on the upside bar 16c.

Note that, in FIGS. 6A and 6B, a difference in the light diffusion of each diffusion adhesive layer is represented by the number of micro beads B: however, various means for changing the light diffusion may be adopted arbitrarily such as changing particle size and particle distribution of micro beads B and using materials of different refractive index and transparency.

Furthermore, the transparency of the frame 16 can be adjusted by printing white dots or the like on the back surface of the frame 16 which is opposed to the reflecting sheet RE. In that case, the density of the white dots is increased as parting from the light source unit 30 to apply the transparency to the frame 16 which depends on a distance from the light source unit 30.

As shown in FIGS. 3 to 5, the reflecting sheet RE is attached to the lower surface SF1 of the frame 16 with the first diffusion adhesive layer 24a, and covers the lower surface side of the frame 16. The reflecting sheet RE is formed to have a film thickness of 200 µm or less, and further, the film thickness is preferably 50 to 90 µm. The reflecting sheet RE has reflectivity of 90% or more, and further, the reflectivity is preferably 95% or more. In addition, in both of the direction in which the longwise bars 16a and 16b of the frame 16 are arranged and the direction in which the sidelong bars 16c and 16d f the frame 16 are arranged, the reflecting sheet RE is formed into a rectangle having external dimensions equal to those of the frame 16. The external surface of the reflecting sheet RE is thereby flush with that of the frame 16. That is, each of the reflecting sheet RE and the frame 16 does not project further than the other.

The backlight unit 20 comprises optical members stored in the frame 16. The optical members include a lightguide plate LG in the shape of a rectangle in a plan view and optical sheets OS stacked on the lightguide plate LG Moreover, the backlight unit 20 comprises the light source unit 30. The light source unit 30 is provided along one side surface (incidence surface) EF of the lightguide plate LG and makes light enter the lightguide plate LG The lightguide plate LG is formed by shaping an extremely thin transmissive resin into rectangle, and has the shape of a rectangular parallelepiped. The lightguide plate LG comprises a first main surface S1 which is a light exit surface, a second main surface S2 on the opposite side to the first main surface S1, and an incidence surface EF connecting the first main surface S1 and the second main surface S2. In the present embodiment, the incidence surface EF is one side surface on the short side of the lightguide plate LG In a plane view, the lightguide plate LG has an external dimension slightly smaller than the internal dimensions of the frame 16 but slightly greater than the display area DA of the LCD panel 12. The plate thickness of the lightguide plate LG is the greatest on one side surface (incidence surface EF) side opposed to the light source unit 30, and is the smallest on the other side surface side on the opposite side to the one side surface. In the present embodiment, as the thickness of the lightguide plate LG, the thickness of the other side surface is, for example, approximately 0.2 to 0.5 mm (200 to 500 µm). The thickness T1 of the frame 16 of the present embodiment is less than that of the thinnest portion of the lightguide plate LG In addition, the sum of the plate thickness of the lightguide plate LG and the thicknesses of the optical sheets OS is substantially equal to that of the thickness T1 of the frame 16 and the thicknesses T2 and T3 of the first diffusion adhesive layer 24a and the second diffusion adhesive layer 24b. That is, the sum of the thicknesses of the lightguide plate LG and the optical sheets OS is, for example, 0.36 to 0.52 mm (360 to 520 µm). Moreover, the extremely thin lightguide plate LG having a plate thickness of 0.2 mm (200 µm) or less also can be used. The lightguide plate LG is overlaid on the reflecting sheet RE in a state in which the second main surface S2 is opposed to the reflecting sheet RE. The incidence surface EF of the lightguide plate LG is opposed to the sidelong bar 16d of the frame 16. The other side surfaces of the lightguide plate LG are opposed to the sidelong bar 16c and the longwise bars 16a and 16b of the frame 16 with a small gap of approximately 0.05 to 0.2 mm (50 to 200 μm) therebetween, respectively.

The optical sheets OS have light transmitting properties, and are stacked on the first main surface S1 of the lightguide plate LG In the present embodiment, a diffusion sheet OS1 and a prism sheet OS2 formed of synthetic resin, for example, polyethylene terephthalate, are used as the optical sheets OS. The diffusion sheet OS1 and prism sheet OS2 are stacked in this order on the first main surface S1 of the lightguide plate LG Each of the optical sheets OS is, in a plan view, formed to have a width equal to that of the lightguide plate LG and a length slightly less than that of the lightguide plate LG Each of the optical sheets OS is formed to have dimensions slightly greater than those of the display area DA of the LCD panel 12. The side edges except a side edge on the light source side, that is, at least three side edges of each of the optical sheets OS are directly opposed to the frame 16 with a predetermined gap (0.1 to 0.5 mm) therebetween. In addition, the optical sheets OS are opposed to the rear surface of the LCD panel 12 with a small gap therebetween. The optical sheets OS are thereby opposed to the whole display area DA of the LCD panel 12.

As shown in FIG. 3 and FIG. 5, the light source unit 30 comprises the flexible printed circuit board (FPC) 32 in the shape of a narrow long strip, and light sources mounted on the FPC 32. As the light sources, in the present embodiment, light-emitting diodes (LEDs) 34, which are point light sources, arranged at predetermined intervals are used. Each of the LEDs 34 comprises a light-emitting surface 34a and a mounting surface 34b perpendicular to the light-emitting surface 34a. The LEDs 34 are arranged at predetermined intervals in the longitudinal direction of the FPC 32 (direction parallel to the sidelong bars of the frame 16). Each of the LEDs 34 is mounted in a state in which the mounting surface 34b is opposed to the FPC 32. The FPC 32 comprises a connection end portion 32a extending from one side edge (see FIG. 3).

One longwise bar of the FPC 32 is overlaid on the sidelong bar 16d by the second diffusion adhesive layer 24b, and the other longwise bar thereof is located on an end portion on the incidence surface EF side of the lightguide plate LG. The LEDs 34 are thereby disposed between the sidelong bar 16d of the frame 16 and the incidence surface EF of the lightguide plate LG The light-emitting surfaces 34a of the LEDs 34 are each opposed to the incidence surface ER In the present embodiment, the LEDs 34 are disposed in the depressions 17 of the sidelong bar 16d. For example, each of the LEDs 34 preferably has a height (thickness) Lh of 0.4 mm (400 μm) or less, and more preferably has a height (thickness) Lh of 0.3 mm (300 μm) or less.

As the light sources, fluorescent tubes or cathode-ray tubes as line light sources also can be adopted. Alternatively, as the light sources, line light sources or surface light sources obtained by disposing organic electroluminescent light sources extremely closely can be adopted.

As shown in FIG. 5, a fourth adhesive layer, for example, double-sided tape 37, is attached to an end portion on the light source side of the optical sheet OS2 and to an end portion on the optical sheets side of the FPC 32. On the light source side, an end portion of the lowest optical sheet OS1 extends further to the light source side than that of the upper optical sheet OS2, and is attached to the double-sided tape 37. The optical sheets OS1 and OS2 are thereby joined to the FPC 32 with the double-sided tape 37.

Moreover, as shown in FIG. 3 and FIG. 5, a third adhesive layer in the shape of a narrow long strip, for example, double-sided tape 36, is overlaid on and attached to the FPC 32 and end portions of the optical sheets OS.

The backlight unit 20 having the above-described structure is disposed to be opposed to the rear surface of the LCD panel 12, and attached to the polarizer PL2 of the LCD panel 12 with the second diffusion adhesive layer 24b and the double-sided tape 36.

That is, the left and right longwise bars 16a and 16b of the frame 16 are attached to end portions on the long sides of the polarizer PL2 with the second diffusion adhesive layer 24b, respectively. Thus, the left and right longwise bars 16a and 16b extend along the long sides of the polarizer PL2. The upside bar 16c of the frame 16 is attached to an end portion on a short side of the polarizer PL2 with the second diffusion adhesive layer 24b. The upside bar 16c extends along the short side of the polarizer PL2. These three side bars 16a, 16b, and 16c are thereby located to be overlaid on the frame area ED of the LCD panel 12 in a plan view. The three side bars 16a, 16, and 16c are flush with side surfaces of the polarizer PL2.

In the present embodiment, at the sides except the side on the light-source mounting side, that is, at three sides of the frame 16, the structure in which the end portion of the polarizer PL2 is flush with that of the LCD panel 12 or the structure in which the end portion of the polarizer PL2 is located further inward than that of the LCD panel 12 can be adopted.

The FPC 32 attached to the downside bar 16d of the frame 16 is attached to, not the polarizer PL2, but the rear surface of the first insulating substrate SUB1 of the LCD panel 12 with the double-sided tape 36. The downside bar 16d and the light source unit 30 are thereby located to be overlaid on the frame area ED and the light shielding layer RS of the cover panel 14.

The FPC 32 of the light source unit 30 is connected to the FPC 22 via the connection end portion 32a (see FIG. 2). A drive current is thereby supplied to the LEDs 34 via the FPC 22 and FPC 32. Light emitted from the LEDs 34 enters the lightguide plate LG from the incidence surface EF of the lightguide plate LG, and travels in the lightguide plate LG. The light exits from the second main surface S2 once, then is reflected by the reflecting sheet RE, and enters the lightguide plate LG again. After passing through such a light path, the light from the LEDs 34 exits from the first main surface (light exit surface) 51 of the lightguide plate LG to the LCD panel 12 side. The exiting light is diffused by the optical sheets OS, and then radiates to the display area DA of the LCD panel 12.

Furthermore, light leaking from the side surfaces of the lightguide plate LG, other than the incidence surface EF, enters the left and right side bars 16a and 16b and the downside bar 16c of the frame 16 and propagates in the frame 16. The light exits from the lower surface SF1 of the frame 16 onto the first diffusion adhesive layer 24a, and then is reflected by the reflecting sheet RE and again enters the first diffusion adhesive layer 24a and the frame 16. After passing through such a light path, the light entering the frame 16 is diffused by the second diffusion adhesive layer 24b and exits the second diffusion adhesive layer 24b to the LCD panel 12 side and is irradiated to the periphery of the LCD panel 12. The periphery includes the frame area ED, the boundary between the frame area ED and the display area DA, and the area surrounding the boundary. As such, the frame 16 and the first and second diffusion adhesive layers 24a and 24b function as an auxiliary light source portion which guides the light leaking around the lightguide plate LG to the LCD panel 12 side. The backlight unit 20 can emit light from the entire surface of the first main surface S1 of the lightguide plate LG and the frame 16 around the lightguide plate LG to the LCD panel 12. Thus, for example, even if the display surface 12a of the LCD panel 12 is viewed from an inclined angle, inappropriateness such as darkened display of the periphery of the display area DA can be prevented. Therefore, a liquid crystal display device having narrower frame as compared to conventional ones can be achieved. That is, in three side bars except the side bar adjacent to the light source unit 30, the outer shape of the backlight unit 20 including the frame 16 can substantially be used as the effective illumination area and the LCD 10 of narrower frame can be achieved.

Note that, in the first embodiment, the frame 16 is formed of a resin sheet material; however, no limitation is intended thereby, and a transparent resin mold frame may be used. In that case, the frame 16 can be used as an auxiliary light source.

Next, an example of a method of manufacturing the backlight unit (backlight device) 20 having the above-described structure will be described. FIG. 7 is a diagram schematically showing an example of a manufacturing apparatus and the entire manufacturing process. FIGS. 8 to 12 are perspective views schematically showing the state of a sheet in respective manufacturing steps. As shown in FIG. 7, the manufacturing apparatus comprises rolls RP, RA1 RA2a, RA2b, RS1, RS2, and RR, each of which is formed by rolling a long sheet material, a pair of first conveyance rollers 80a and 80b which conveys sheet materials drawn from the rolls along a conveyance path CP, a pair of second conveyance rollers 82a and 82b, a collection roll RC into which a separator is rolled and collected, a first punch P1 and a second punch P2 which punch sheet materials moving along the conveyance path CP, etc.

The rolls include the roll RP, into which a sheet material for forming a frame, for example, a PET sheet 50, is rolled, the roll RA1, into which a first diffusion adhesive layer is rolled, the rolls RA2a and RA2b, into which second diffusion adhesive layers are rolled, respectively, and the rolls RS1 and RS2, into which separators are rolled, respectively. In the present embodiment, only diffusion adhesive layers, or combinations of a base material and pressure-sensitive adhesive, are used as the first and second diffusion adhesive layers. Double-sided tape may be used as the diffusion adhesive layers. In addition, the width of each of the rolls is equal to the dimension between the short sides of the backlight unit. Only the roll RA2b has a width slightly less than those of the other rolls.

As shown in FIG. 7, first, sheet materials drawn from the rolls RP, RA1, RA2a, RA2b, RS1, and RS2, for example, the PET sheet 50, the first diffusion adhesive layer 24a, a second diffusion adhesive layer 24b1, a second diffusion adhesive layer 24b2, and the separators, are conveyed through a space between the pair of conveyance rollers 80a and 80b, and thereby stacked on and attached to each other. That is, as shown in FIG. 8 and FIG. 9, the first diffusion adhesive layer 24a is attached to the whole lower surface (first surface) of the PET sheet 50. In addition, the second diffusion adhesive layer 24b1 is attached to the whole upper surface (second surface) of the PET sheet 50, and further, the second diffusion adhesive layer 24b2 is attached thereto in an area except a predetermined area along one side portion. Surfaces on the opposite side to those attached to the PET sheet 50 of the first diffusion adhesive layer 24a and the second diffusion adhesive layer 24b2 are covered by the separators.

Next, as shown in FIG. 7 and FIG. 10, the first diffusion adhesive layer 24a, the sheet material 50, the second diffusion adhesive layers 24b1 and 24b2, and the separators are punched together by the first punch (a metal mold, etc) P1, and rectangular inner holes 52a and 52b corresponding to the inner shapes (inner holes) of frames are sequentially formed. Then, the separator on the first diffusion adhesive layer 24a is peeled off, and rolled and collected into the collection roll RC. In this state, as shown in FIG. 7 and FIG. 11, the reflecting sheet RE drawn from the roll RR is attached to the whole surface of the first diffusion adhesive layer 24a. The sheet material 50, the diffusion adhesive layers, and the reflecting sheet RE pass through a space between the pair of conveyance rollers 82a and 82b, and are conveyed along the conveyance path CP.

Figure 12:
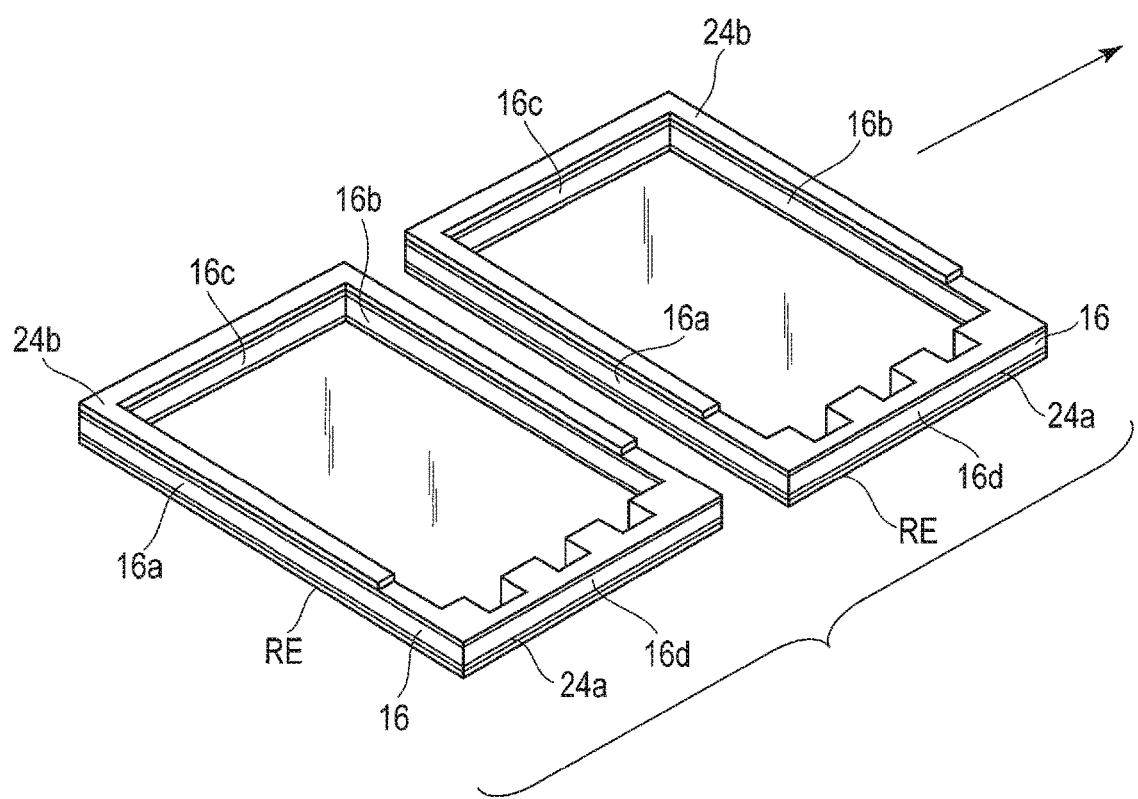
FIG. 12 is a perspective view showing the backlight devices, the outer shapes of which are formed by punching, in the manufacturing steps.

Then, as shown in FIG. 7 and FIG. 12, the first diffusion adhesive layer 24a, the sheet material 50, the second diffusion adhesive layers 24b1 and 24b2, the separator on the second diffusion adhesive layer 24b2, and the reflecting sheet RE are punched together by the second punch (a metal mold, etc.) P2, and the outer shapes of frame 16, reflecting sheet RE, and each of diffusion adhesive layers 24ba and 24b2 are formed at once. The frames 16 each provided with the reflecting sheet RE and the diffusion adhesive layers 24ba and 24b2 are thereby sequentially formed. Then, as shown in FIG. 6, backlight units 20 are obtained by mounting and fixing lightguide plates LG, optical sheets OS, and light source units 30 on the formed frames 16. The lightguide plates LG, the optical sheets OS, and the light source units 30 may be unitized in advance by joining them to each other with diffusion adhesive layers, for example, double-sided tape.

According to the present embodiment, the frame 16 of backlight is formed by punching a thin sheet having a thickness of 0.4 mm (400 μm) or less, for example, a thickness of 0.15 to 0.25 mm (150 to 255 μm). A thin frame with narrow side portions, which is hard to produce by injection molding, can be thereby obtained. By using the frame, a backlight device and a liquid crystal display device which are ever thinner and have narrow frames can be achieved at low prices. For example, the thickness of a frame can be 0.2 mm or less, and the width of side portions can be 0.45 mm or less. A reduction in thickness and the narrowing of the frame can be easily achieved. Moreover, since the frame is made thinner, an extremely thin lightguide plate having a plate thickness of 0.2 mm or less can be used. Thus, an ever thinner backlight device can be obtained.

In addition, since a sheet, diffusion adhesive layers 24a and 24b on the sheet, and reflecting sheet RE are punched at once together with the frame 16, the width of the diffusion adhesive layer and the external dimensions of the reflecting sheet can be conformed to the frame 16 at high precision.

A structure according to a comparative example will be discussed. In the comparative example, at first, a frame is singly formed, and then, diffusion adhesive layers are adhered or applied to the frame. In the comparative example, if each side bar of the frame is formed in a extremely narrow width, it is hard to provide diffusion adhesive layers on the upper and lower surfaces of the side bars, and the diffusion adhesive layers will project from the side bars. The projecting adhesive layers not only have a bad influence on subsequent steps, but also causes a decrease in the light-emitting performance of a backlight device if it adheres to the other structures of the backlight device.

In contrast, in the backlight device of the present embodiment, the width of the diffusion adhesive layers 24a and 24b is conformed to that of the side bars of the frame 16, and the side surfaces (side edges) of the diffusion adhesive layers 24a and 24b those of the frame 16 are flush with each other. Therefore, dimensions of the backlight device can be made more accurately in the present embodiment. Moreover, since the sheet 50, the diffusion adhesive layers 24a and 24b, and the reflecting sheet RE are punched at once, the simplification of manufacturing steps and an improvement in the precision of each member are attempted. In addition, the tolerance between each member, which is required when the members are separately formed and stacked, can be reduced, and a further reduction in thickness and the further narrowing of the frame are attempted. Therefore, the present embodiment is effective to achieve a thinner structure with a narrower frame.

Next, a liquid crystal display device according to other embodiments and modifications will be described. In the other embodiment described hereinafter, the same portions as those of the above-described first embodiment will be given the same reference numbers and a detailed description thereof will be omitted or simplified. Portions differing from those of the first embodiment will mainly described in detail.

(Second Embodiment)

Figure 14:
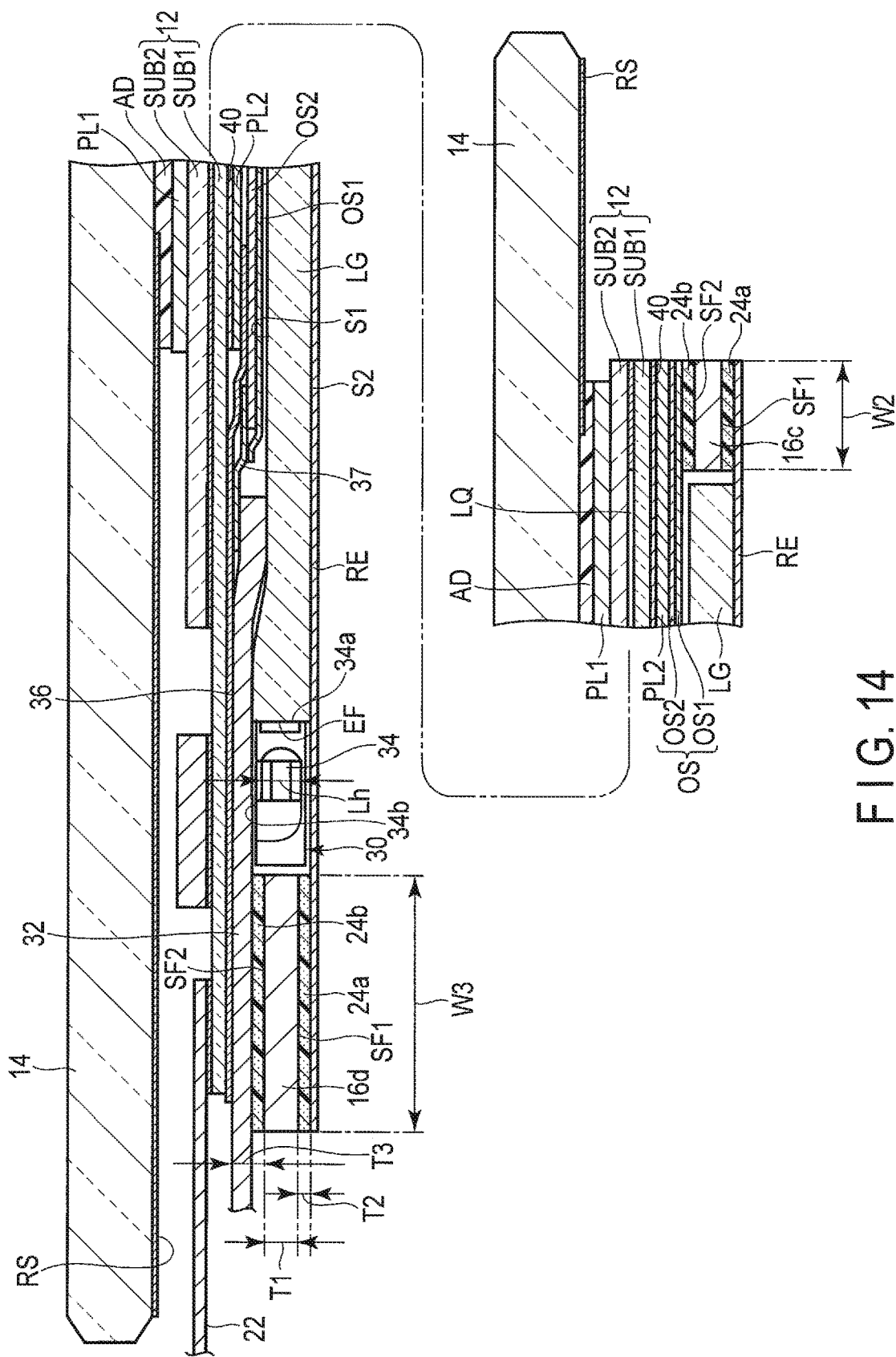
FIG. 14 is a vertical sectional view of the liquid crystal display device of the second embodiment.

FIG. 13 is a horizontal sectional view of a liquid crystal display device of a second embodiment and FIG. 14 is a vertical sectional view showing a part of the liquid crystal display device of the second embodiment.

As shown in FIGS. 13 and 14, according to the present embodiment, in the liquid crystal display device 10, the optical sheet OS of the backlight unit 20 is adhered to a second surface SF2 of the frame 16 with the second diffusion adhesive layer 24b interposed therebetween. The optical sheets OS are opposed to the lightguide plate LG with a gap therebetween. The optical sheets OS include a diffusion sheet OS1 adhered to the upper surface SF2 of the frame 16 with the second diffusion adhesive layer 24b interposed therebetween and a prism sheet OS2 overlaid on the diffusion sheet OS1 Furthermore, the prism sheet OS2 contacts the polarizer PL2 of the LCD panel 12. That is, the prism sheet OS2 makes a surface contact to the entire surface of the polarizer PL2. Note that the polarizer PL2 is adhered to the rear surface of the second substrate SUB with a diffusion adhesive layer 40 containing micro beads.

In the left and right side bars 16a and 16b and the upside bar 16c of the frame 16, the external surface of the frame 16 is flush with the side surfaces of the diffusion sheet OS1 and prism sheet OS2. Furthermore, in the three side bars 16a, 16b, and 16c, the external surface is flush with the side surfaces of the polarizer PL2 of the LCD panel 12 and the side surfaces of the first and second insulating substrates SUB and SUB. The width We of the left and right side bars 16a and 16b and the width We of the upside bar 16c conform to the width of the frame area ED of the LCD panel 12, respectively. Therefore, the three side bars 16a, 16b and 16c are overlaid, in a plane view, on the frame area of the LCD panel 12.

Note that the unevenness on the diffusion sheet OS1 is filled with the second diffusion adhesive layer 24b, and a difference between refractive indices of the diffusion sheet OS1 ad the interface of the second diffusion adhesive layer 24b is small. Thus, light diffusion at the interface can be decreased. However, with the light diffusion of the second diffusion adhesive layer 24b, light from the frame 16 can be properly radiated to the optical sheets SO.

With the second embodiment structured as above, the tolerance between the frame and the optical sheet is not necessary to consider. Therefore, the frame 16 which functions as a light source can disposed further inside with respect to the LCD panel 12, that is, closer to the effective display area DA as compared to the example of the first embodiment. Therefore, the liquid crystal display device can be achieved with a much narrower frame. Furthermore, even if the diffusion sheet and the prism sheet are integrated with the polarizer PL2 of the LCD panel 12, decrease of the diffusion function of the diffusion sheet OS1 can be canceled by imparting a light diffusion function to the diffusion adhesive layer 40 between the polarizer PL2 and the second insulating substrate SUB2 of the LCD panel 12 and unevenness in the display when the display surface is viewed from the cover panel 14 side can be decreased. The diffusion adhesive layer 40 is not made to project from the polarizer PL2 to prevent unnecessary light leaking therefrom. In addition, the advantages obtained in the first embodiment can be achieved in the second embodiment.

(Third Embodiment)

Figure 15:
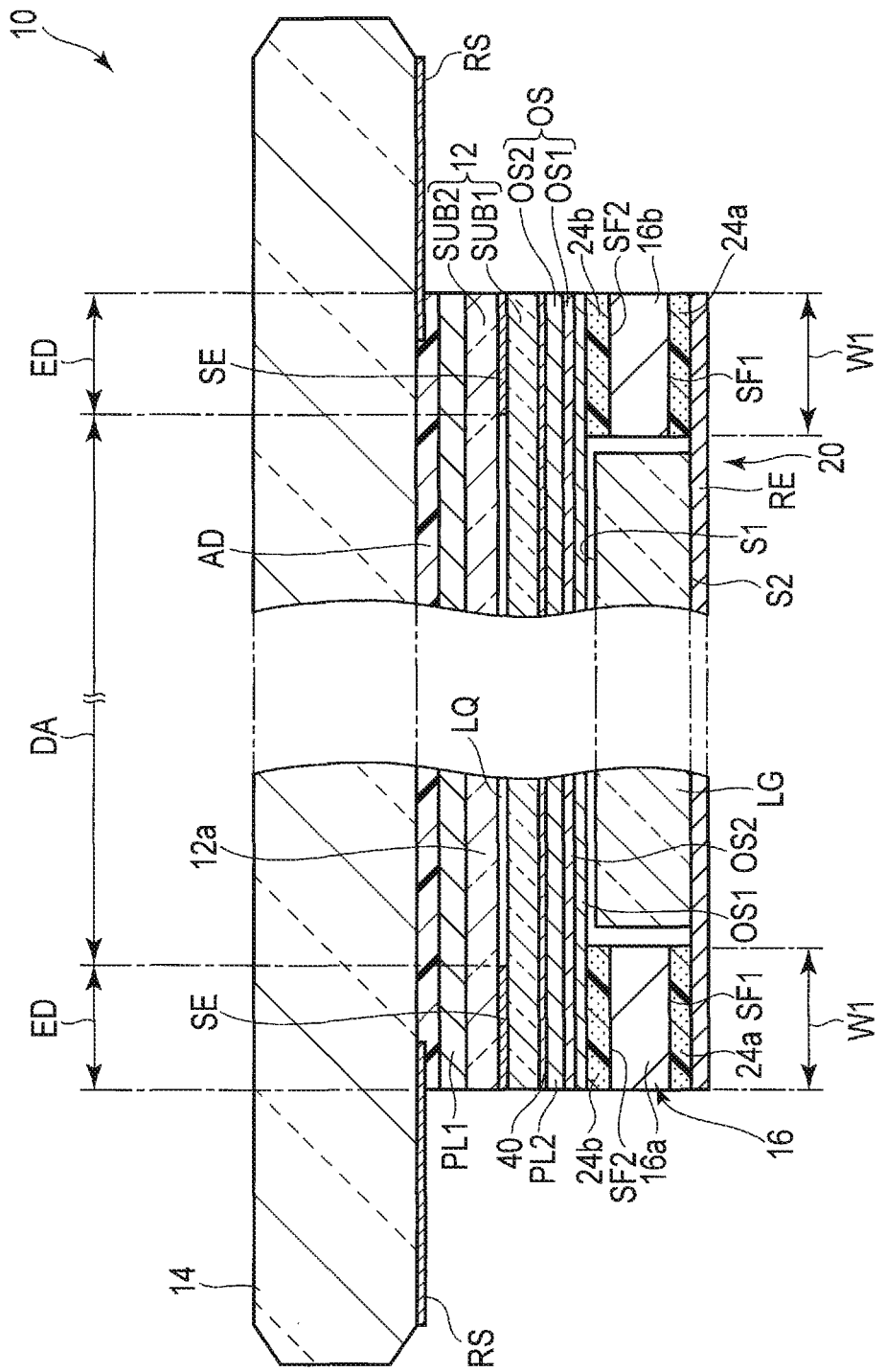
FIG. 15 is a horizontal sectional view of a liquid crystal display device of a third embodiment.

FIG. 15 is a horizontal sectional view of a liquid crystal display device of a third embodiment and FIG. 16 is a vertical sectional view showing a part of the liquid crystal display device of the third embodiment.

As shown in FIGS. 15 and 16, according to the present embodiment, the frame 16 which functions as a light source is embedded further inside the LCD panel 12, that is, to the effective display area DA side. In the frame 16, a pair of the long wise bars 16a and 16b and the side long bar 16c which is opposite to the light source unit 30 are, in the thickness direction of the LCD panel 12, overlaid on the frame area (non-display area) ED of the LCD panel 12 and at least a part thereof, in this example, the inner side edges thereof opposed to the light guide plate PG are overlaid on the effective display area DA. The other structures of the liquid crystal display device 10 of the third embodiment are the same as those of the liquid crystal display device 10 of the second embodiment.

With the third embodiment structured as above, by using the frame 16 which functions as a light source, the frame 16 can be disposed inside the LCD panel 12 such that it can be overlaid on the effective display area DA. Therefore, a liquid crystal display device with a much narrower frame can be achieved. Furthermore, since the frame 16 and the effective display area DA can be overlaid with each other, a misaligned in the adhesion to the LCD panel 12 of the back light unit 20 can be absorbed to a certain extent during the manufacturing process of the liquid crystal display device. Therefore, assemblage or productivity of the liquid crystal display devices can be improved. In addition, the advantages obtained in the first embodiment can be achieved in the third embodiment.

(Fourth Embodiment)

FIG. 17 is a horizontal sectional view of a liquid crystal display device of a fourth embodiment and FIG. 18 is a vertical sectional view showing a part of the liquid crystal display device of the fourth embodiment.

As shown in FIGS. 17 and 18, in the present embodiment, the reflecting sheet RE of the back light unit 20 includes a plurality of end portions FREE extending outward over the external edge of the frame 16. The end portions FREE are bent to the cover panel 14 side and adhered to the outer side surfaces of the frame 16 and the LCD panel 12. In the present embodiment, in the long wise bars 16a and 16b and the side long bar 16c of the frame, the outer side surfaces of the frame 16, first and second diffusion adhesive layers 24a and 24b, and LCD panel 12 are covered with the end portions FREE of the reflecting sheet RE. Therefore, light leaking from the external surfaces of the frame 16, first and second diffusion adhesive layers 24a and 24b, and optical sheets SO can be reflected by the end portions FREE of the reflecting sheet RE to send back into the frame 16 and first and second diffusion adhesive layers 24a and 24b to irradiate the light to the LCD panel 12. Therefore, light usage of the back light unit 20 can be more efficient.

Note that the other structures of the liquid crystal display device 10 of the fourth embodiment are the same as those of the liquid crystal display device 10 of the third embodiment.
(Fifth Embodiment)

Figure 19:
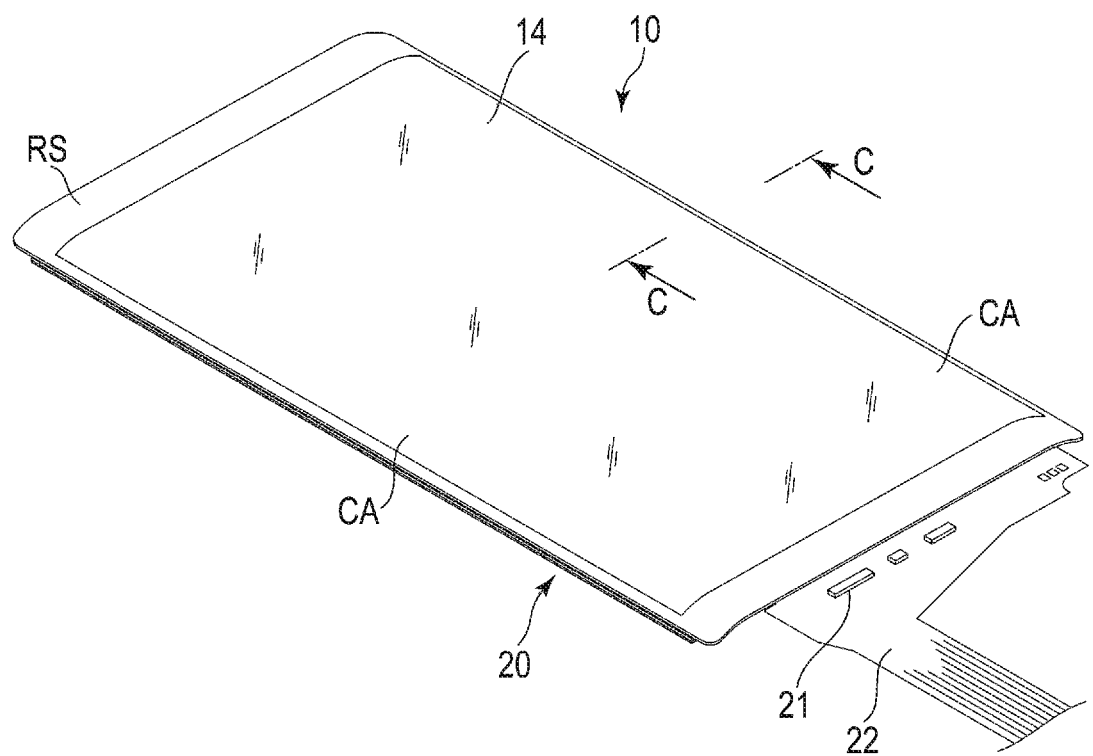
FIG. 19 is a perspective view showing a display surface side of a liquid crystal display device according to a fifth embodiment.
Figure 20:
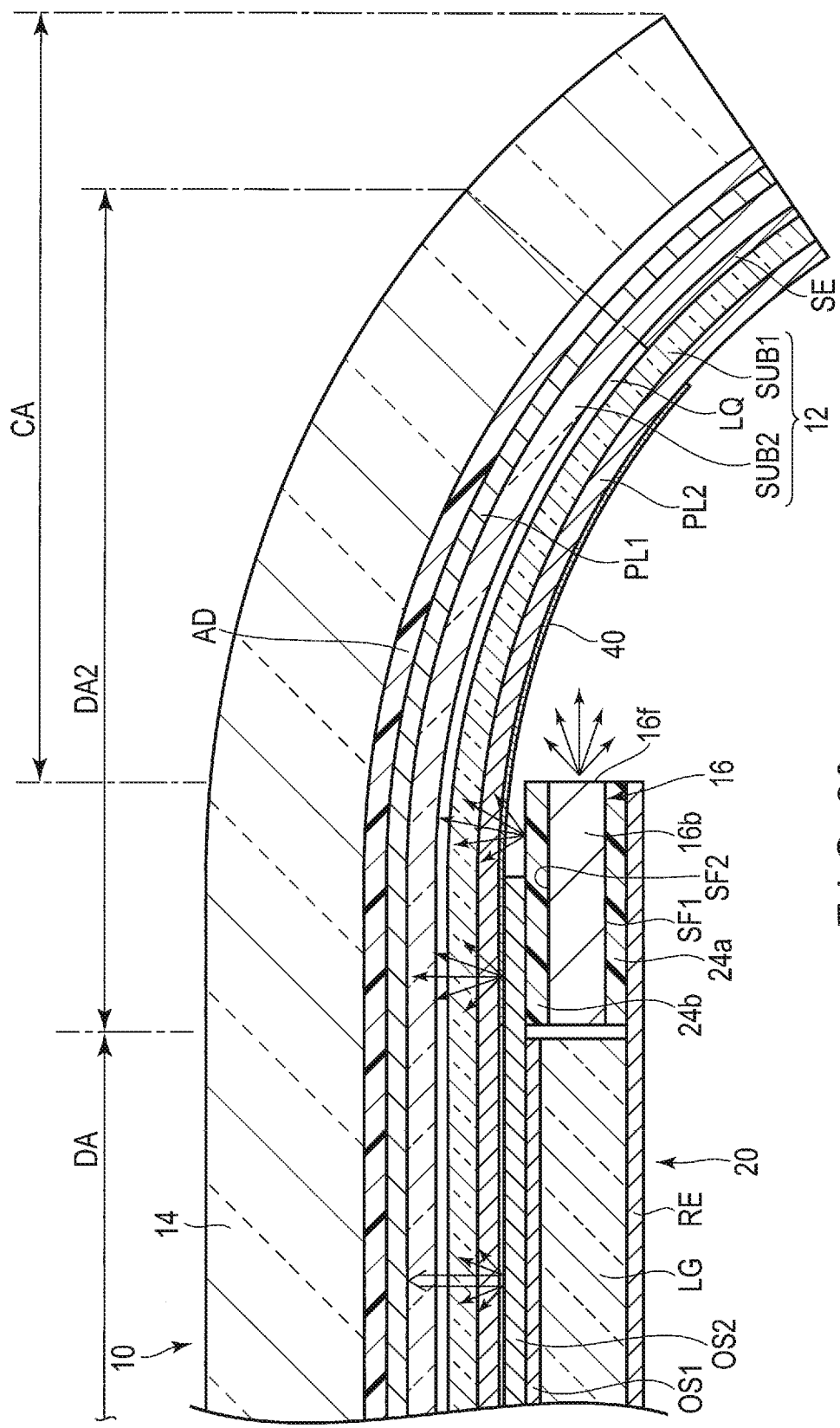
FIG. 20 is a sectional view of the liquid crystal display device taken along line C-C of FIG. 19.

FIG. 19 is a perspective view showing a display surface side of a liquid crystal display device according to a fifth embodiment. FIG. 20 is a sectional view of the liquid crystal display device taken along line C-C of FIG. 19.

The liquid crystal display device of the present embodiment is very thin, and thus, at least a part of the liquid crystal display device can be curved to an outer surface direction. In the fifth embodiment, as shown in FIGS. 19 and 20, the both end portions of the long sides of the liquid crystal display device 10 structure a curved portion CA curved downward, that is, to the back light device 20 side.

For example, the both end portions of the long sides of the cover panel 14 are preliminary formed to be curved in the back light device 20 side. The LCD panel 12 including the polarizers PL1 And PL2 is adhered to the cover panel 14 with an adhesive sheet AD formed of an optical transparent resin. Therefore, the both end portions of the long sides of the LCD panel 12 are curved along the cover panel 14. In the present embodiment, the both end portions of the long sides of the LCD panel 12 extend to a position where they are flush with the both end edges of the long sides of the cover panel 14. The degree of the curve of the curved portion CA such as curvature can be adjusted arbitrarily.

In the back light unit 20, the optical sheet (diffusion sheet) OS1 is disposed inside the frame 16 mounted on the light guide plate LG The optical sheet (prism sheet) OS2 is mounted on the optical sheet OS1 and the periphery portion of the optical sheet OS2 is adhered to the second surface SF2 of the frame 16 with the second diffusion adhesive layer 24b interposed therebetween. In the present embodiment, dimensions of the optical sheet OS2 are slightly smaller than the external dimension of the frame 16. Therefore, the side edges of the long sides of the optical sheet OS2 are located inside the outer side edges of the long wise bars 16a and 16b of the frame 16.

The back light unit 20 is opposed to the flat portion of the LCD panel 12. The light guide plate PG and the optical sheet OS1 are opposed to the display area DA of the LCD panel 12. The periphery of the optical sheet OS2, that is, the part overlapping with the frame 16 is adhered to the polarizer PL2 with a transparent diffusion adhesive layer 40. Therefore, the back light unit 20 is adhered to the LCD panel 12. The diffusion adhesive layer 40 contains micro beads and is light diffusive. Furthermore, the diffusion adhesive layer 40 is disposed on the surface of the polarizer PL2 from a position opposed to the frame 16 to a position opposed to the inner edges of the sealing material SE.

The cover panel 14 and the curved portion CA of the LCD panel 12 extend over the both side edges of the long sides of the frame 16 and cover the outer side surface 16f of the frame 16 and is obliquely opposed to the outer side surface 16f. The back light unit 20 is formed in a plate-like shape and does not project to the curved portion CA. In this state, the back light unit 20 is attached, and thus, external surfaces of the frame 16 are opposed to the curved portion CA.

According to the fifth embodiment structured as above, the both end portions of the long sides of the LCD panel 12 are curved to be the curved portion CA. Therefore, variations of the panel design can be increased, and the liquid crystal display device can be used in a broader range. Furthermore, with the both side edges of the LCD panel 12 can be extended to the side edges of the cover panel 14 over the frame 16, the effective display area DA of the LCD panel 12 can be enlarged by the area DA2. That is, in the present embodiment, the frame 16 around the light guide plate PG can be used as an auxiliary light source which emits light to the LCD panel 12 side, and thus, the light can be entered to the display area DA2 located outside the light guide plate PG from the frame 16. Therefore, the display area DA2 can be used as the effective display area, and an image can be displayed thereon. As can be understood from the above, in the both side edges of the long sides of the LCD panel 12, the effective illumination area can be substantially extended to the outside the back light unit 20 including the frame 16, and the liquid crystal display device 10 of much narrower frame structure can be achieved.

In addition, the advantages obtained in the first embodiment can be achieved in the fifth embodiment. Note that, in the fifth embodiment, the curved portion is not limited to the both side portions of the long sides, and the entirety of the liquid crystal display may be curved.
(First Modification)

Figure 21:
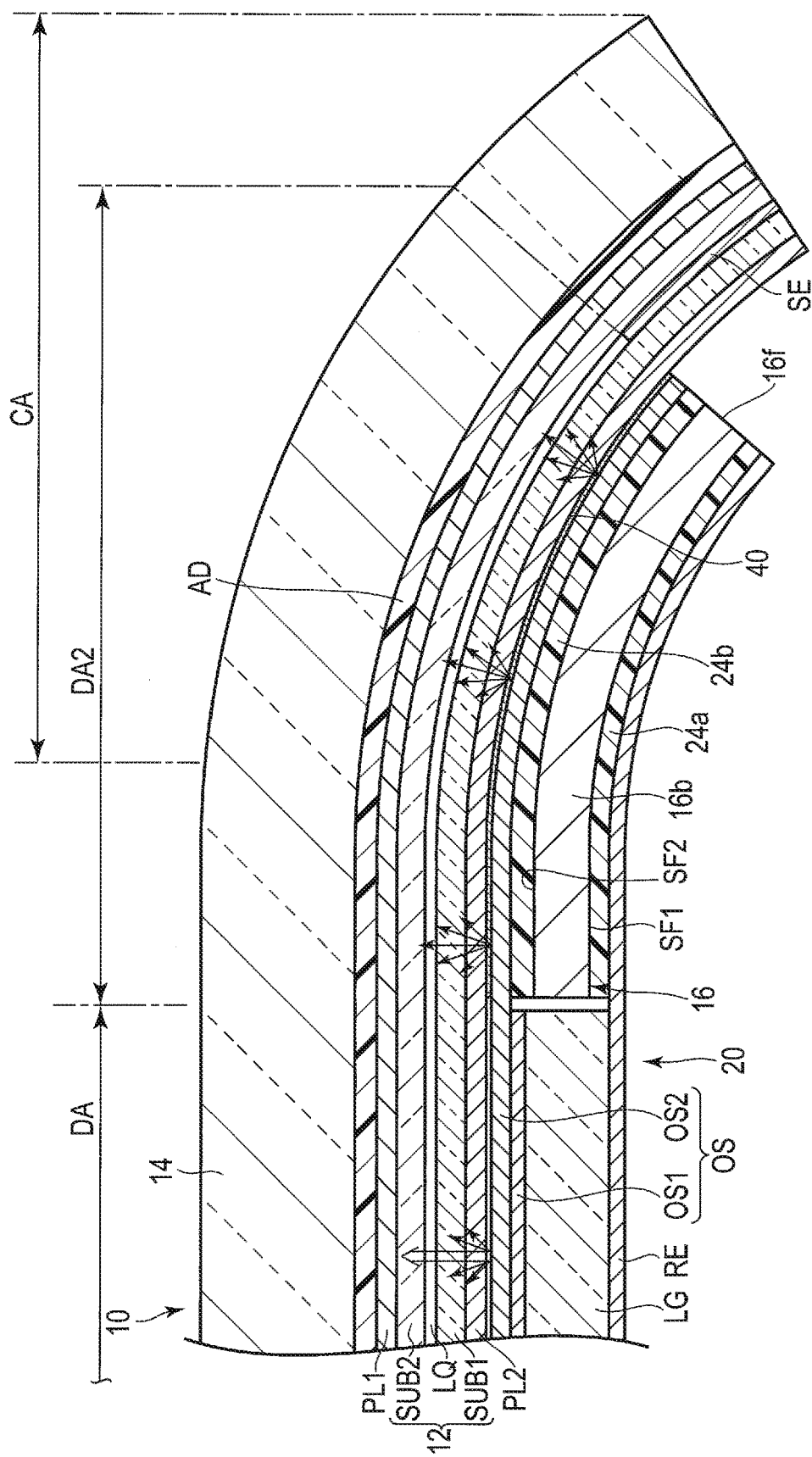
FIG. 21 is a sectional view of a liquid crystal display device according to a first modification.

FIG. 21 is a sectional view showing a part of the liquid crystal display device of a first modification.

In the fifth embodiment, the frame 16 may be made wider such that the frame 16 is partly curved along the LCD panel 12. As shown in FIG. 21, in the first modification, the long wise bars 16a and 16b of the frame 16 are formed wider and extend from the proximity of the side surfaces of the light guide plate PG to the proximity of the inner edges of the sealing material SE of the LCD panel 12. The end portion of the reflecting sheet SE is adhered to the lower surface SC of the frame 16 of the first diffusion adhesive layer 24a and covers the lower surface SC of the frame 16. The end portion of the optical sheet (prism sheet) OS2 is adhered to the upper surface SF2 of the frame 16 with the second diffusion adhesive layer 24b and covers the upper surface SF2 of the frame 16. In this modification, the side surfaces of the reflecting sheet RE and the side surfaces of the optical sheet OS2 are flush with the outer side surface of the frame 16.

The peripheries of the frame 16 and the optical sheet OS2 are adhered to the polarizer PL2 of the LCD panel 12 with the diffusion adhesive layer 40 of light diffusive. Therefore, the frame 16, periphery of the reflecting sheet RE, and periphery of the optical sheet OS2 are curved along the LCD panel 12 and are opposed to the curve part CA and display area DA2 of the LCD panel 12. In the first modification, the frame which functions as an auxiliary light source is provided with the entire area of the curved portion CA and display area DA2, and thus, greater light can be emitted to the display area dA2. Furthermore, in that case, the narrower frame structure of the liquid crystal display device is maintained since the frame 16 functions as an auxiliary light source. Furthermore, light form the auxiliary light source is irradiated to the display area DA2, and thus, the luminosity of the display area DA2 may be slightly decreased as compared to the display area DA. On the other hand, the display area DA2 including the curved portion CA is considered for an auxiliary use such as a sub-window when the display area DA is used as a main window. In such an auxiliary use, the display area DA2 can be used effectively even if it emits lower luminosity than the display area DA.
(Second Modification)

Figure 22:
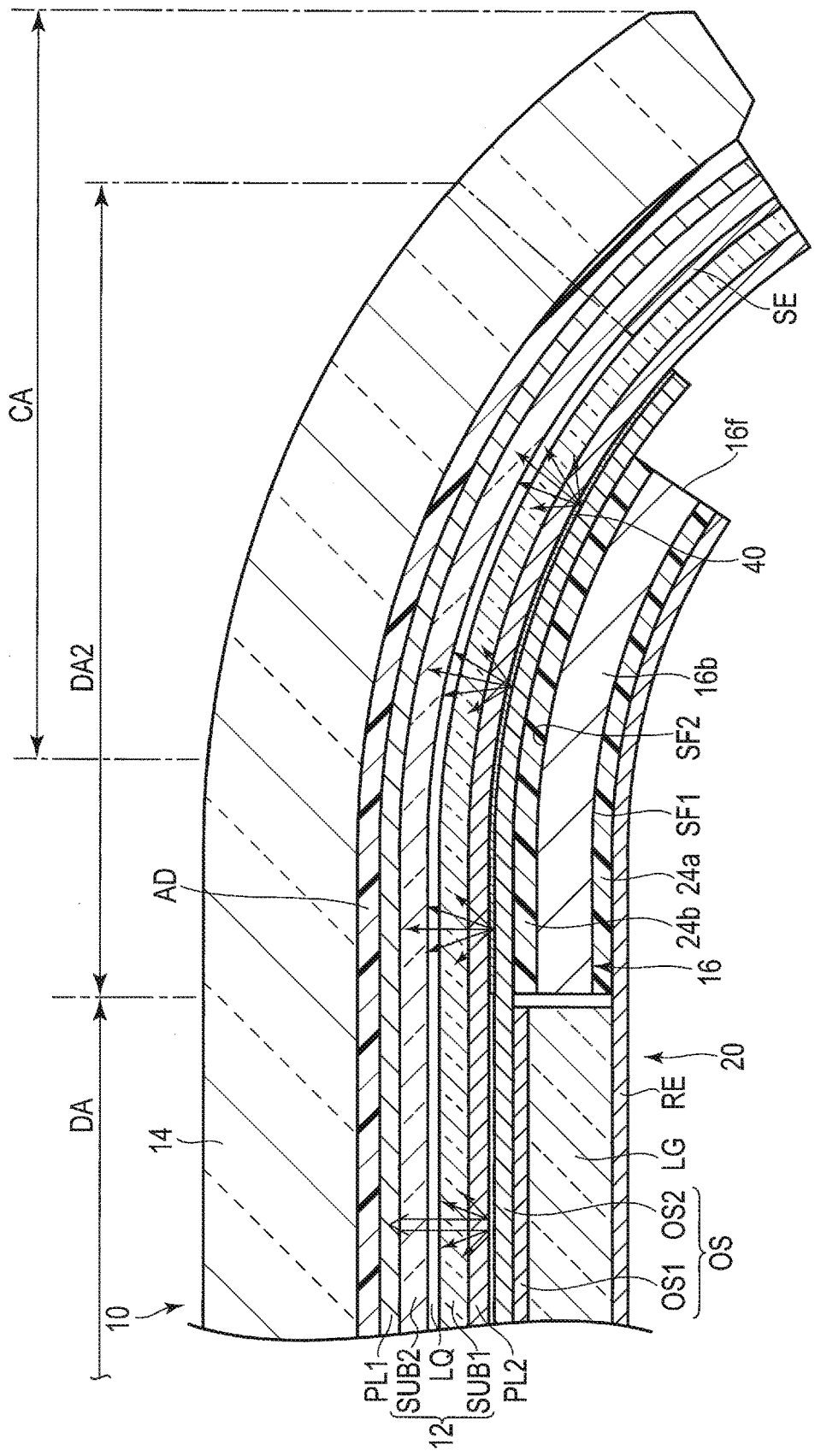
FIG. 22 is a sectional view of a liquid crystal display device according to a second modification.

FIG. 22 is a sectional view of a part of a liquid crystal display device of a second modification.

In this modification, only the periphery of the optical sheet OS2 extends to the proximity of the sealing material SE of the LCD panel 12 and is adhered to the polarizer PL2 with the diffusion adhesive layer 40. The long wise bars 16a and 16b of the frame 16, first diffusion adhesive layer 24a, second diffusion adhesive layer 24b, and periphery of the reflecting sheet RE are formed to be slightly shorter than the optical sheet OS2 and extend before the sealing material SE.

With such a structure, light emitted from the frame 16 is diffused by the optical sheet OS2 and the diffusion adhesive layer 40 and is irradiated on the entirety of the display area DA2. Furthermore, the width of the back light unit 20 is made small and the liquid crystal display device can be miniaturized as a whole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes that can be implemented by a person with ordinary skill in the art through arbitrary design changes based on the structures and manufacturing processes described above as the embodiments of the present invention are included in the scope of the present invention as long as they encompass the spirit of the present invention. For example, the LCD panel may not be attached to the cover panel in the initial process, but the LCD panel may be accommodated in the container case with the back light unit accommodated therein, and then be attached to the cover panel together with the flanges of the container case. Alternatively, the LCD panel may not adhere to the cover panel, such that it is slightly movable in the container case. Furthermore, the LCD panel may be fixed to the back light unit, and the LCD panel and the back light unit fixed to each other may be accommodated in the container case.

Furthermore, other advantages that can be obtained by the above-described embodiments and are obvious from the description of this specification or can be conceived by a person with ordinary skill in the art as appropriate are naturally acknowledged as advantages of the present invention.

The number of optical sheets of the back light unit is not limited to two, and may be increased or reduced as necessary. The shapes of the LCD panel 12, the components of the back light unit 20, and the container case 16 are not limited to rectangles in a planar view, but may be other shapes such as a polygon in a planar view, a circle, an ellipse, and a combination thereof. Materials used for the components are not limited to the above-described examples and may be selected from various options.

What is claimed is:

1. A backlight device comprising:
   a frame formed of a transparent resin;
   a first diffusion adhesive layer with a light diffusion, disposed on a first surface of the frame;
   a second diffusion adhesive layer with a light diffusion, disposed on a second surface of the frame which is opposite to the first surface;
   a reflecting sheet adhered to the frame with the first diffusion adhesive layer;
   a light guide plate on the reflecting sheet in the frame; and
   a light source disposed in the frame to enter light to the light guide plate.

2. The backlight device of claim 1, further comprising an optical sheet provided on the light guide plate in the frame.

3. The backlight device of claim 1, further comprising an optical sheet adhered to the frame with the second diffusion adhesive layer and opposed to the light guide plate.

4. The backlight device of claim 1, wherein the first diffusion adhesive layer and the second diffusion adhesive layer are each formed of a binder containing micro beads refractive index of which is different from that of the binder.

5. The backlight device of claim 4, wherein the light diffusion of the first diffusion adhesive layer is higher than that of the second diffusion adhesive layer.

6. The backlight device of claim 1, wherein the frame is formed of a transparent resin sheet, and
   in at least a part of the frame, a width of the frame matches with a width of the first adhesive layer and at least an external side surface of the frame and an external side surface of the first diffusion adhesive layer are flush with each other.

7. The backlight device of claim 6, wherein a side surface of the reflecting sheet is flush with the external side surfaces of the first diffusion layer and the frame in the at least a part of the frame.

8. The backlight device of claim 7, wherein the frame is 0.4 mm or less in thickness.

9. The backlight device of claim 1, wherein the frame comprises at least four bars including a first bar adjacent to the light source and a second bar opposed to the first bar, and
   the first diffusion adhesive layer on the second bar is more diffusive than the first diffusion adhesive layer disposed in a different side.

10. The backlight device of claim 1, wherein the reflecting sheet includes an external end portion covering the external side surface of the frame and the external side surfaces of the first and second diffusion adhesive layers.

11. A liquid crystal display device comprising:
    a liquid crystal display panel, and
    a backlight device of claim 1 opposed to the liquid crystal display panel.

12. The liquid crystal display device of claim 11, wherein the frame is adhered to the liquid crystal display panel with the second diffusion adhesive layer, and the backlight device comprises an optical sheet disposed on the light guide plate in the frame.

13. The liquid crystal display device of claim 11, wherein the backlight device comprises an optical sheet adhered to the frame with the second diffusion adhesive layer, and the optical sheet contacts the liquid crystal display panel.

14. The liquid crystal display device of claim 11, wherein the liquid crystal display panel includes a display area and a non-display area around the display area, and the frame overlaps the non-display area, and at least a part of the frame overlaps the display area.

15. The liquid crystal display device of claim 11, wherein the first diffusion adhesive layer is formed of a binder containing micro beads refractive index of which is different from that of the binder.

16. The liquid crystal display device of claim 15, wherein the second diffusion adhesive layer is formed of a binder containing micro beads refractive index of which is different from that of the binder, and the light diffusion of the first diffusion adhesive layer is higher than that of the second diffusion adhesive layer.

17. The liquid crystal display device of claim 11, wherein the frame is formed of a transparent resin sheet, and in at least a part of the frame, a width of the frame matches with a width of the first adhesive layer and at least an external side surface of the frame and an external side surface of the first diffusion adhesive layer are flush with each other.

18. The liquid crystal display device of claim 11, wherein the liquid crystal display panel comprises a curved portion which curves to the backlight device side.

19. The liquid crystal display device of claim 11, wherein the liquid crystal display panel includes a pair of long sides opposed to each other and a pair of short sides opposed to each other, in which side edge portion on the long sides of the liquid crystal display panel are curved to the backlight device side and constitute the curved portion, and the frame comprises a long side opposed to the curved portion.

20. The liquid crystal display device of claim 19, wherein the long side of the frame is adhered to the curved portion through an optical sheet and a diffusion adhesive layer and curves along the curved portion.

\* \* \* \* \*